United States Patent
Atta et al.

(10) Patent No.: US 10,720,865 B2
(45) Date of Patent: Jul. 21, 2020

(54) PORTABLE POWER GENERATOR WITH POWER MONITOR AND CONTROL

(71) Applicant: TTI (MACAO COMMERCIAL OFFSHORE) LIMITED, Macau (MO)

(72) Inventors: Mina William Atta, Anderson, SC (US); Michael R. Gardner, Anderson, SC (US); Gavin P. Conti, Greenville, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 28 days.

(21) Appl. No.: 16/228,335

(22) Filed: Dec. 20, 2018

(65) Prior Publication Data
US 2019/0190419 A1    Jun. 20, 2019

Related U.S. Application Data

(60) Provisional application No. 62/608,318, filed on Dec. 20, 2017.

(51) Int. Cl.
*F02B 63/04* (2006.01)
*H02K 7/18* (2006.01)
(Continued)

(52) U.S. Cl.
CPC ............ *H02P 9/006* (2013.01); *F02B 63/042* (2013.01); *F02B 63/047* (2013.01); *F02P 5/15* (2013.01);
(Continued)

(58) Field of Classification Search
CPC .... H02P 9/006; H02P 2101/25; F02B 63/042; F02B 63/047; F02P 5/15
See application file for complete search history.

(56) References Cited

U.S. PATENT DOCUMENTS 5,135,413 A * 8/1992 Pannizzo ................. E06B 7/28
                                                           174/481
6,055,163 A    4/2000 Wagner et al.
(Continued)

FOREIGN PATENT DOCUMENTS

DE    102012003073 A1    8/2013
EP        2523270 A1    11/2012
(Continued)

*Primary Examiner* — Tulsidas C Patel
*Assistant Examiner* — Thomas K Quigley
(74) *Attorney, Agent, or Firm* — Michael Best & Friedrich LLP

(57) ABSTRACT

A portable power generator with power monitor and control. The portable generator may include an alternator powered by an engine and configured to generate an alternator output, a first output receptacle coupled to the alternator output through a first switch, and a second output receptacle coupled to the alternator output through a second switch. The portable generator may further include a sensor unit configured to detect at least one output parameter of the first output receptacle. An electronic processor of the portable generator may be configured to receive first sensor signals indicating a measured quantity of the at least one output parameter of the first output receptacle and determine that the measured quantity exceeds a predetermined threshold. The processor may also be configured to disable the first output receptacle in response to determining that the measured quantity exceeds the predetermined threshold.

20 Claims, 15 Drawing Sheets

(51) Int. Cl.
*H02P 9/00* (2006.01)
*H02P 9/10* (2006.01)
*F02P 5/15* (2006.01)
*H02P 101/25* (2016.01)

(52) U.S. Cl.
CPC .......... *H02P 9/107* (2013.01); *H02P 2101/25* (2015.01)

(56) References Cited

U.S. PATENT DOCUMENTS

| | | | |
|---|---|---|---|
| 6,172,428 B1 * | 1/2001 | Jordan | H02P 9/04 290/400 |
| 6,778,921 B2 * | 8/2004 | Keane | H02J 1/102 307/31 |
| 7,015,599 B2 * | 3/2006 | Gull | H02J 3/005 307/64 |
| 7,053,497 B2 * | 5/2006 | Sodemann | F02D 29/06 290/1 A |
| 7,305,291 B2 | 12/2007 | Koenig et al. | |
| 7,511,451 B2 * | 3/2009 | Pierce | H01M 2/10 312/351.11 |
| 7,514,813 B2 | 4/2009 | McKelvey et al. | |
| 7,861,537 B2 | 1/2011 | Givens | |
| 7,969,032 B2 | 6/2011 | Shinya et al. | |
| 8,014,216 B2 | 9/2011 | Carey et al. | |
| 8,049,346 B2 | 11/2011 | Kitch | |
| 8,138,430 B1 * | 3/2012 | Ucero | H02G 3/128 174/480 |
| 8,143,836 B2 | 3/2012 | Iwashita et al. | |
| 8,305,737 B2 * | 11/2012 | Ewing | G06F 1/266 361/622 |
| 8,593,002 B2 | 11/2013 | Hamm et al. | |
| 8,648,495 B2 | 2/2014 | Chou et al. | |
| 8,653,679 B2 | 2/2014 | Lim et al. | |
| 8,723,346 B2 | 5/2014 | Hamm et al. | |
| 8,810,081 B1 * | 8/2014 | Flegel | H01R 13/447 307/30 |
| 8,841,797 B2 * | 9/2014 | Wischstadt | G05B 15/02 307/64 |
| 8,994,336 B2 * | 3/2015 | Brotto | H02M 7/44 320/136 |
| 9,136,711 B2 | 9/2015 | Slota et al. | |
| 9,285,783 B2 * | 3/2016 | Craig | G05B 13/02 |
| 9,445,481 B2 | 9/2016 | Kim | |
| 9,548,692 B2 | 1/2017 | Hsiao et al. | |
| 9,628,009 B2 | 4/2017 | Koenen et al. | |
| 9,952,261 B2 * | 4/2018 | Ewing | H04Q 9/00 |
| 2004/0199297 A1 * | 10/2004 | Schaper | H02J 7/1415 700/287 |
| 2005/0216131 A1 * | 9/2005 | Sodemann | H02J 13/0006 700/295 |
| 2007/0296223 A1 * | 12/2007 | Saylor | F02B 63/04 290/1 R |
| 2008/0023965 A1 | 1/2008 | Cagliari et al. | |
| 2010/0289333 A1 * | 11/2010 | Gilpatrick | H02J 3/14 307/39 |
| 2011/0202193 A1 * | 8/2011 | Craig | G06Q 10/00 700/295 |
| 2012/0091843 A1 | 4/2012 | Gore | |
| 2015/0364950 A1 | 12/2015 | Lu | |
| 2015/0381080 A1 | 12/2015 | Virella | |
| 2017/0149287 A1 | 5/2017 | Nakano et al. | |
| 2017/0223807 A1 * | 8/2017 | Recker | H02J 7/34 |
| 2017/0363022 A1 * | 12/2017 | Tedder | F02D 41/1454 |
| 2018/0041151 A1 * | 2/2018 | Turpin | H02P 9/04 |
| 2018/0241255 A1 * | 8/2018 | Leabman | H02J 50/40 |
| 2019/0013766 A1 * | 1/2019 | Stach | H01R 27/02 |

FOREIGN PATENT DOCUMENTS

EP          2628427 A2    8/2013
WO   2000/067355 A1    11/2000

* cited by examiner

PORTABLE POWER GENERATOR WITH POWER MONITOR AND CONTROL

CROSS REFERENCE TO RELATED APPLICATION

This application claims priority to U.S. Provisional Application No. 62/608,318, filed on Dec. 20, 2017, the entire contents of which are incorporated herein by reference.

FIELD

The present invention generally relates to portable power generators and, more particularly, to control modules and control panels for portable power generators.

SUMMARY

In one independent embodiment, a portable power generator may generally include an alternator powered by an engine and configured to generate an alternator output, a first output receptacle coupled to the alternator output through a first switch, and a second output receptacle coupled to the alternator output through a second switch. The portable power generator may further include a sensor unit configured to detect at least one output parameter of the first output receptacle, and an electronic processor coupled to the sensor unit and the first switch. The processor may be configured to receive, from the sensor unit, first sensor signals indicating a measured quantity of the at least one output parameter of the first output receptacle and determine that the measured quantity exceeds a predetermined threshold. The processor may also be configured to disable the first output receptacle (e.g., control the first switch to open) in response to determining that the measured quantity exceeds the predetermined threshold.

In some constructions, the processor may further be configured to display, on a display unit of the portable power generator, the measured quantity of the at least one output parameter of the first output receptacle. In some constructions, the sensor unit detects at least one of an output current, an output voltage, an output frequency, and an output power of the first output receptacle.

In some constructions, the processor may also be configured to provide, via a transceiver coupled to the processor, data signals indicating a status of the first switch to an external electronic device, the status indicating whether the first switch is open or closed. In some constructions, the processor may further be configured to receive, via the transceiver, a control signal instructing the processor to close the first switch from the external electronic device, the external electronic device sending the control signal in response to a user input and control the first switch to close in response to receiving the control signal from the external electronic device.

In some constructions, the processor may also be configured to receive, via the transceiver, a control signal instructing the processor to open the first switch from the external electronic device, the external electronic device sending the control signal in response to a user input and control the first switch to open in response to receiving the control signal from the external electronic device. In some constructions, the processor may further be configured to provide, via a transceiver, second data signals indicating the measured quantity of the at least one output parameter of the first output receptacle to the external electronic device, the external electronic device displaying the measured quantity on a display unit. In some constructions, the processor is coupled to the second switch and is also configured to keep the second switch closed when the first switch is opened.

In some constructions, the processor may be further configured to receive, via the transceiver, a control signal from the external electronic device instructing the processor to keep the first output receptacle ON for a first predetermined time period and to start a timer in response to receiving the control signal from the external electronic device. The processor may also be configured to determine whether the first predetermined time period has elapsed based on the timer and to turn OFF the first output receptacle in response to determining that the first predetermined time period has elapsed.

In some constructions, the generator may also include a mode selector switch movable between a first position corresponding to a normal-power output mode and a second position corresponding to a high-power output mode. The processor may be further configured to determine that the mode selector switch is in the first position and to enable normal-power output and disable high-power output in response to determining that the mode selector switch is in the first position. The processor may be further configured to determine that the mode selector switch is in the second position and to enable high-power output and disable normal-power output in response to determining that the mode selector switch is in the second position. In some constructions, the normal-power output corresponds to power output of 120V at 20 A, and high-power output corresponds to power output of 240V at 30 A.

In some constructions, the mode selector switch includes a one position push-button switch that may be depressed to switch between the normal-power output mode and the high-power output mode. The processor may be further configured to determine that the power generator is in a first operating state and determine that the mode selector switch is depressed. The processor may be further configured to switch the power generator to a second operating state in response to determining that the mode selector switch is depressed. The first operation mode and the second operation mode may be one or the other of the normal-power output mode and the high-power output mode.

In some constructions, the processor may be configured to receive, from the sensor unit, a sensor signal indicating a measured quantity of the at least one output parameter of the generator and to determine that the measured quantity exceeds a predetermined threshold. The processor may also be configured to control the engine to stop in response to determining that the measured quantity exceeds the predetermined threshold.

In some constructions, the processor may also be configured to receive, via the transceiver, a control signal from the external electronic device instructing the processor to stop the engine after a predetermined time period, the external electronic device sending the control signal in response to a user input, and to start a timer in response to receiving the control signal from the external electronic device. The processor may also be configured to determine whether the predetermined time period has elapsed based on the timer and to control the engine to stop in response to determining that the first predetermined time period has elapsed. In some constructions, the processor controls an engine kill switch to close to stop the engine.

In some constructions, the processor may also be configured to receive, via the transceiver, a control signal from the external electronic device instructing the processor to stop the engine immediately or after a predetermined time period, the external electronic device sending the control signal in response to a user input. The processor may also be configured to control the engine to stop in response to receiving the control signal from the external electronic device. In some constructions, the processor controls an engine kill switch to close to stop the engine.

In some constructions, the processor may be further configured to store, in a memory, an overload chart providing a mapping between a plurality of parameter thresholds and a plurality of time periods and to receive, from the sensor unit, a first sensor signal indicating a measured quantity of the at least one output parameter of the first output receptacle. The processor may also be configured to determine whether the measured quantity is equal to or exceeds a first parameter threshold from the plurality of parameter thresholds and to start a timer for a first time period corresponding to the first parameter threshold in response to determining that the measured quantity is equal to or exceeds the first parameter threshold. The processor may be further configured to determine whether the first time period has elapsed and to control the first switch to open in response to determining that the first time period has elapsed.

In another independent embodiment, a power adapter may be configured to be connected to and receive input power from a wall outlet or a power generator outlet. The adapter may generally include a first output receptacle coupled to the power input through a first switch, and a second output receptacle coupled to the power input through a second switch. The power adapter may further include a sensor unit configured to detect at least one output parameter of the first output receptacle and at least one output parameter of the second output receptacle, and an electronic processor coupled to the sensor unit, the first switch, and the second switch. The processor may be configured to receive, from the sensor unit, a first sensor signal indicating a measured quantity of the at least one output parameter of the first output receptacle and to determine that the measured quantity exceeds a predetermined threshold. The processor may also be configured to disable the first output receptacle (e.g., control the first switch to open) in response to determining that the measured quantity exceeds the predetermined threshold.

In another independent embodiment, a method of operating a power generator may generally include receiving, from a sensor unit, first sensor signals indicating a measured quantity of at least one output parameter of a first output receptacle and determining that the measured quantity exceeds a predetermined threshold. The method may also include, using the processor, disabling the first output receptacle (e.g., by controlling the first switch to open) in response to determining that the measured quantity exceeds the predetermined threshold.

In some constructions, the method further includes displaying, on a display unit of the portable power generator, the measured quantity of the at least one output parameter of the first output receptacle. In some constructions, the method also includes providing, via a transceiver, data signals indicating a status of the first switch to an external electronic device, the status indicating whether the first switch is open or closed.

In some constructions, the method further includes receiving, via a transceiver, a control signal instructing the processor to close the first switch from the external electronic device, the external electronic device sending the control signal in response to a user input and controlling, using the processor, the first switch to close in response to receiving the control signal from the external electronic device. In some constructions, the method also includes receiving, via a transceiver, a control signal instructing the processor to open the first switch from the external electronic device, the external electronic device sending the control signal in response to a user input and controlling, using the processor, the first switch to open in response to receiving the control signal from the external electronic device.

In some constructions, the method further includes providing, via a transceiver, second data signals indicating the measured quantity of the at least one output parameter of the first output receptacle to the external electronic device, wherein the external electronic device displays the measured quantity on a display unit. In some constructions, the second switch remains closed when the first switch is opened.

In some constructions, the method may also include receiving, via the transceiver, a control signal from the external electronic device instructing the processor to keep the first output receptacle ON for a first predetermined time period and starting, using the processor, a timer in response to receiving the control signals from the external electronic device. The method may further include determining whether the first predetermined time period has elapsed and turning OFF the first output receptacle in response to determining that the first predetermined time period has elapsed.

In some constructions, the method may further include determining, using the processor, that a mode selector switch is in a first position and, using the processor, enabling normal-power output and disabling high-power output in response to determining that the mode selector switch is in the first position. The method may also include determining, using the processor, that the mode selector switch is in a second position and, using the processor, enabling high-power output and disabling normal-power output in response to determining that the mode selector switch is in the second position. In some constructions, the normal-power output corresponds to power output of 120V at 20 A, and high-power output corresponds to power output of 240V at 30 A.

In some constructions, the method may further include determining, using the processor, that the power generator is in a first operation mode and determining, using the processor, that a mode selector switch is depressed. The method may also include switching the power generator to a second operation mode in response to determining that the mode selector switch is depressed. The first operation mode and the second operation mode may be one or the other of the normal-power output mode and the high-power output mode.

In some constructions, the method may also include receiving, at the processor from the sensor unit, a sensor signal indicating a measured quantity of the at least one output parameter of the generator and determining, using the processor, that the measured quantity exceeds a predetermined threshold. The method may further include controlling, using the processor, the engine to stop in response to determining that the measured quantity exceeds the predetermined threshold.

In some constructions, the method may also include receiving, at the processor via the transceiver, a control signal from the external electronic device instructing the processor to stop the engine immediately or after a predetermined time period, the external electronic device sending the control signal in response to a user input, and starting, using the processor, a timer in response to receiving the control signal from the external electronic device. The method may further include determining, using the processor, whether the predetermined time period has elapsed based on the timer and controlling, using the processor, the engine to stop in response to determining that the first predetermined time period has elapsed. In some constructions, the processor may control an engine kill switch to close to stop the engine.

In some constructions, the method may also include receiving, at the processor via the transceiver, a control signal from the external electronic device instructing the processor to stop the engine immediately, the external electronic device sending the control signal in response to a user input. The method may further include controlling, using the processor, the engine to stop in response to receiving the control signal from the external electronic device. In some constructions, the processor may control an engine kill switch to close to stop the engine.

In some constructions, the method further includes storing, in a memory, an overload chart providing a mapping between a plurality of parameter thresholds and a plurality of time periods and receiving, at the processor from the sensor unit, first sensor signals indicating a measured quantity of the at least one output parameter of the first output receptacle. The method also includes determining, using the processor, whether the measured quantity is equal to or exceeds a first parameter threshold from the plurality of parameter thresholds and starting, using the processor, a timer for a first time period corresponding to the first parameter threshold in response to determining that the measured quantity is equal to or exceeds the first parameter threshold. The method further includes determining whether the first time period has elapsed and controlling, using the processor, the first switch to open in response to determining that the first time period has elapsed.

In yet another independent embodiment, a method of operating a power generator may include receiving, at an electronic processor from a sensor unit, a plurality of sensor signals indicating a plurality of measured quantities of at least one output parameter of a plurality of output receptacles and determining, using the processor, that a first subset of the plurality of measured quantities corresponding to a first subset of a plurality of output receptacles exceed a predetermined threshold. The method may also include determining, using the processor, that a second subset of the plurality of measured quantities corresponding to a second subset of the plurality of output receptacles do not exceed the predetermined threshold. The method may further include, using the processor, disabling the first subset of output receptacles (e.g., by controlling a first subset of the plurality of switches corresponding to the first subset of the plurality of output receptacles to open) while maintaining operation of the second subset of output receptacles (e.g., by keeping a second subset of the plurality of switches corresponding to the second subset of the plurality output receptacles closed).

In another independent embodiment, a method of operating a power adapter may generally include receiving, at an electronic processor from a sensor unit, a first sensor signal indicating a measured quantity of at least one output parameter of a first output receptacle and determining, using the processor, that the measured quantity exceeds a predetermined threshold. The method may also include, using the processor, disabling the first output receptacle (e.g., by controlling the first switch to open) in response to determining that the measured quantity exceeds the predetermined threshold.

Other independent aspects of the invention may become apparent by consideration of the detailed description, claims and accompanying drawings.

DETAILED DESCRIPTION

Figure 1:
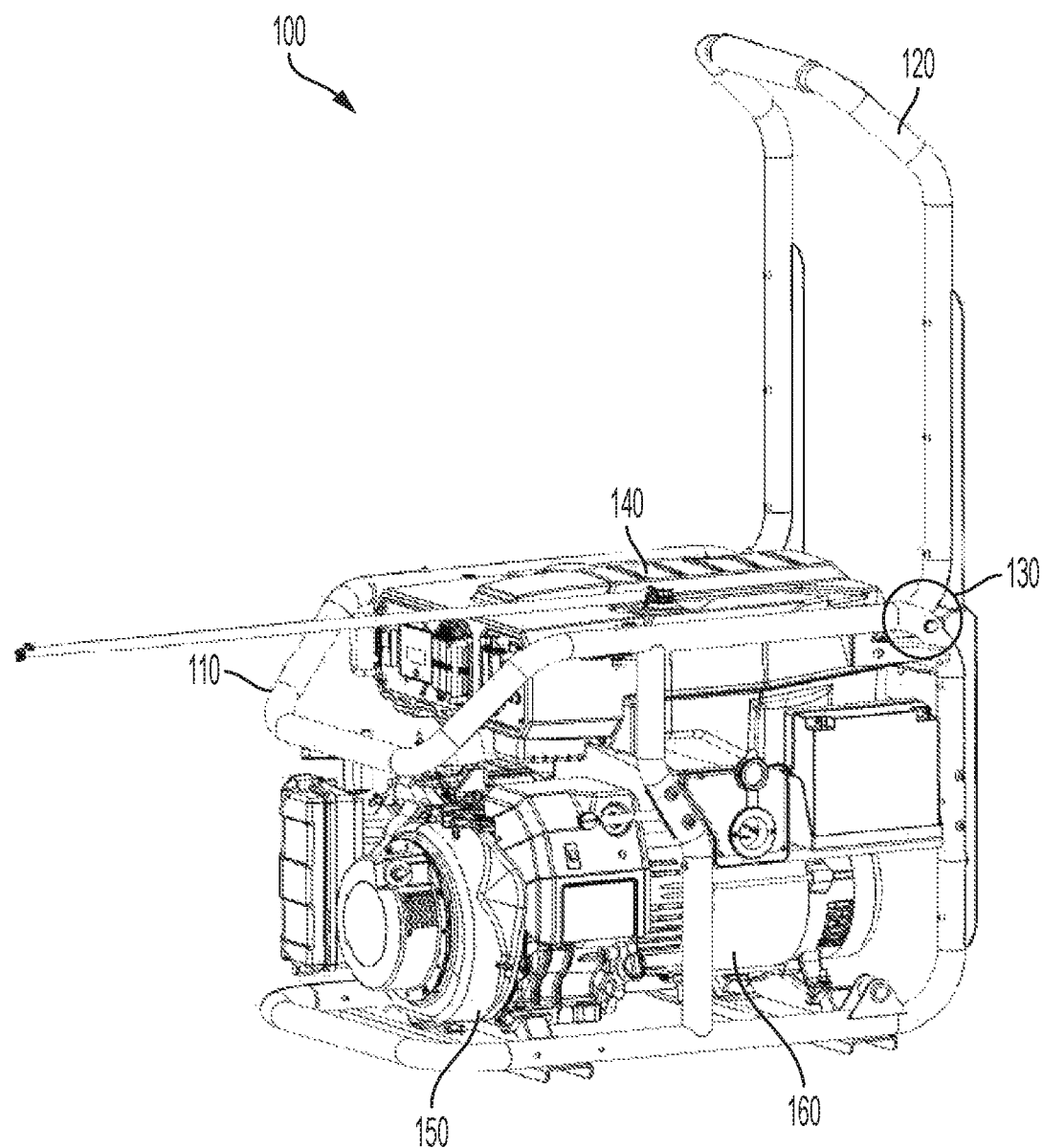
FIG. 1 is a perspective view of a portable power generator.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Various arrangements for a control module for a portable power generator are illustrated and described. The control module is configured to monitor output parameters (voltage, current, frequency, power, etc.) of the power generator and of individual output receptacles/circuits and individually control current supply to each output receptacle based on the output parameters. In some constructions, the control module is configured to communicate with an electronic device to provide the output parameters to the electronic device. The electronic device may also be used to individually control the output receptacles.

With reference to FIG. 1, a portable power generator 100 includes a frame 110 having a folding handle 120 pivotable about a hinge 130 to fold forward and down to meet the top side of the generator 100. The generator 100 further includes a fuel tank 140, an engine 150, and an alternator 160. The engine 150 is, for example, an internal combustion engine that operates on a fuel stored in the fuel tank 140. In other embodiments, other kinds of engines or generators may be used in place of the engine 150.

In some constructions (not shown), two or more wheels are secured to the bottom of the frame 110 for transport of the generator 100. The generator 100 may also include an engine ignition block 295 (see FIG. 2) to start and stop the engine 150.

Figure 2:
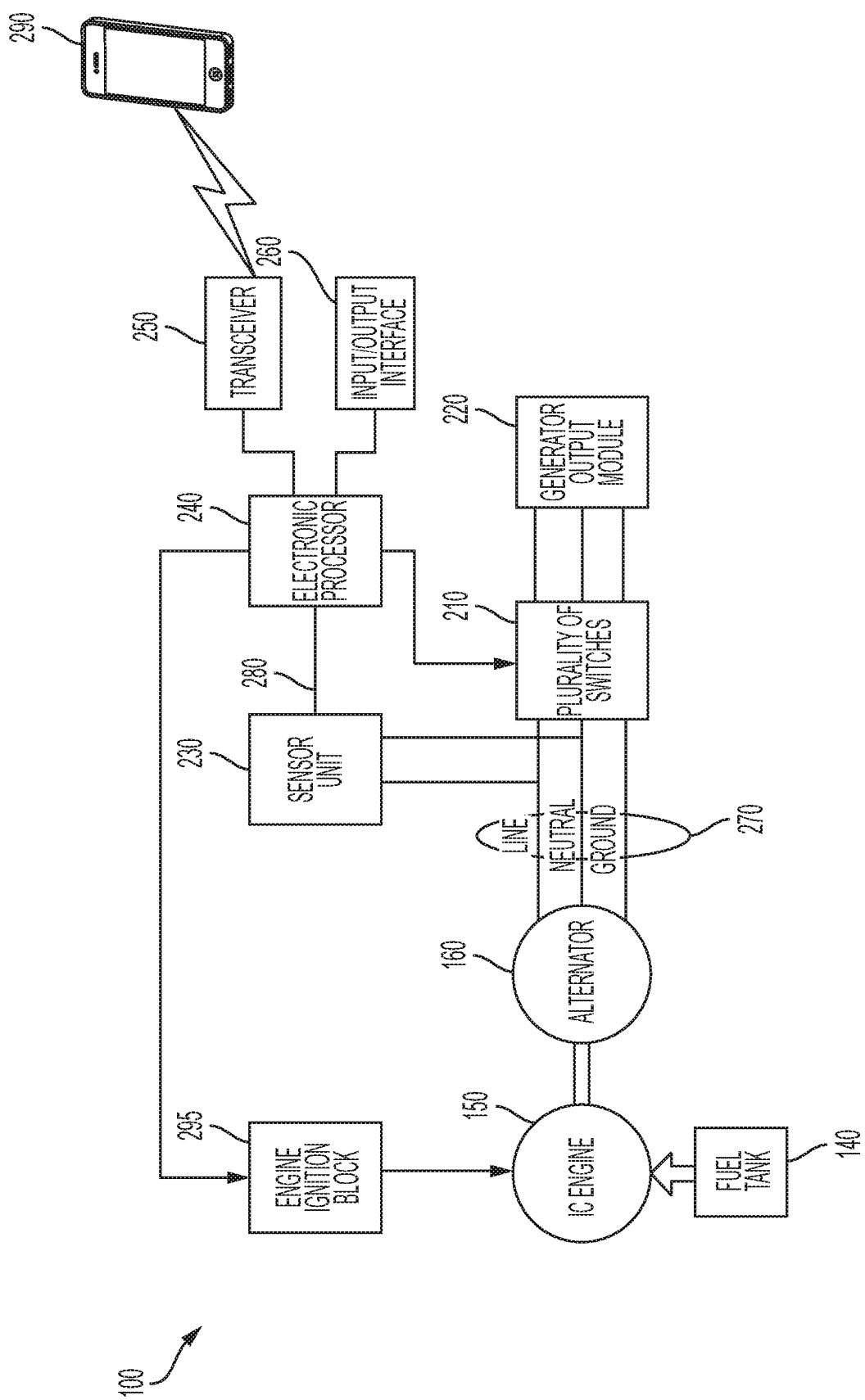
FIG. 2 is a block diagram of the generator of FIG. 1.

As shown in FIG. 2, the illustrated generator 100 includes a plurality of switches 210, a generator output module 220, a sensor unit 230, an electronic processor 240, a transceiver 250, and an input/output interface 260. The engine 150 rotates a rotor of the alternator 160, which generates an alternating current (AC) in the stator of the alternator 160. The alternating current is output as the alternator output 270 to the generator output module 220.

Figure 3:
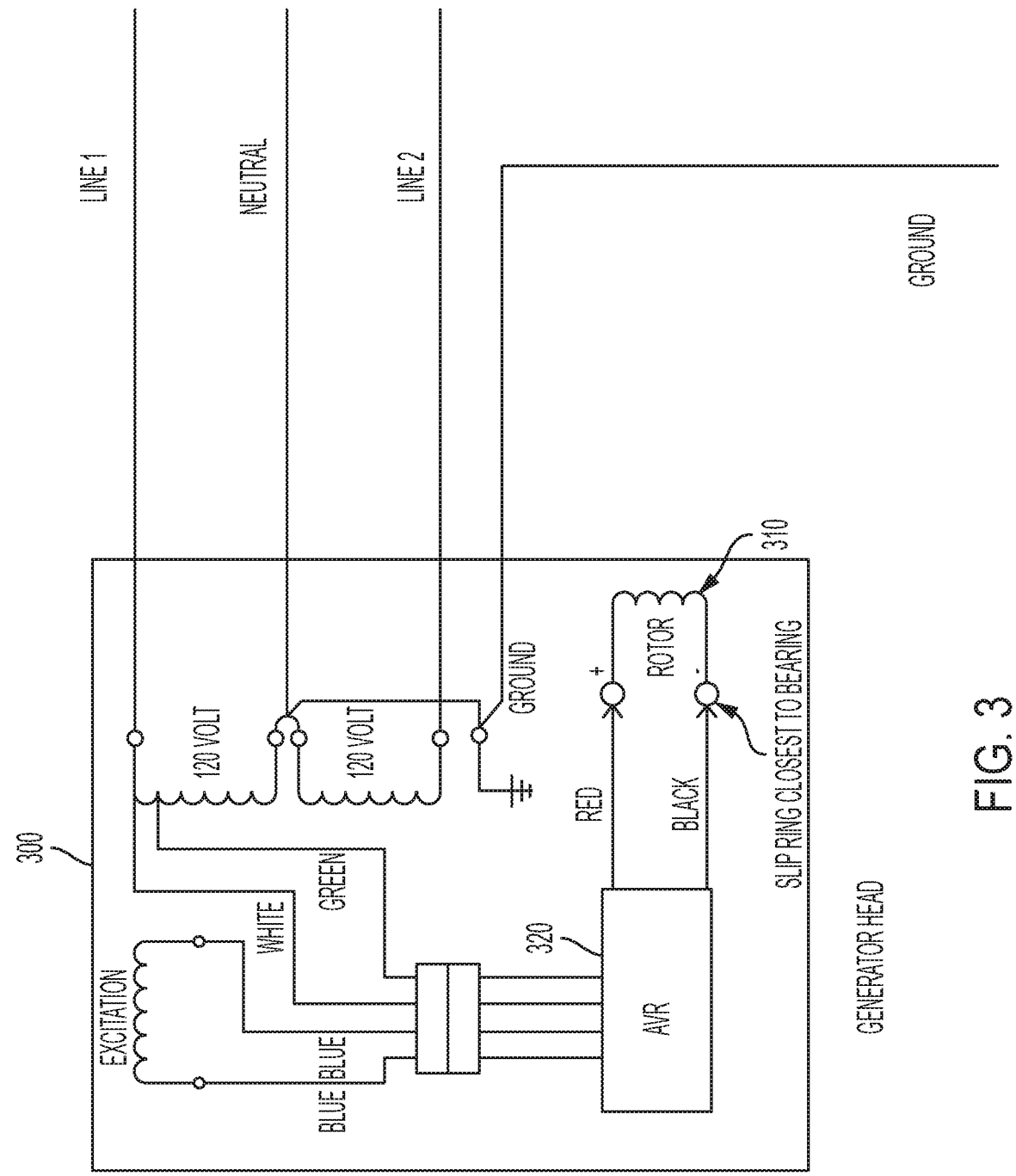
FIG. 3 is a block diagram of a generator head of the generator of FIG. 1.

FIG. 3 illustrates a generator head 300 including the alternator 160. The alternator 160 includes a rotor 310 rotated by the engine 150. The rotor 310 may be a permanent magnet rotor or an electric magnet rotor operable to produce an electric field in slip rings provided by an automatic voltage regulator 320. The stator of the alternator 160 provides a regulated alternator output 270 maintaining a constant output voltage.

The alternator output 270 is provided through a LINE1, LINE2, NEUTRAL, and GROUND. The generator head 300 provides two LINE voltages in order to effectively provide output voltage to multiple output receptacles (see FIG. 6; e.g., three receptacles 510, 520, 530 illustrated). The output AC current flows through LINE1 and LINE2 and back to the alternator 160 through NEUTRAL. When the generator 100 provides a 240V output, the output AC current flows through LINE1 and back to the alternator 160 through LINE2.

Returning to FIG. 2, the plurality of switches 210 are coupled between the alternator 160 and the generator output module 220 and selectively provide the alternator output 270 to the generator output module 220. The generator output module 220 includes a plurality of output receptacles 510, 520, 530. Each output receptacle 510, 520, 530 is coupled to the alternator output 270 through at least one switch of the switches 210. The switches 210 may be implemented using metal-oxide-semiconductor field effect transistors (MOSFETs), bi-polar junction transistors (BJTs), relays, etc. The switches 210 are controlled to open and close by the processor 240. When a switch 210, connecting an output receptacle (e.g., 510) to the alternator output 270, is closed, the switch 210 allows current to flow through from the alternator 160 to the output receptacle (e.g., receptacle 510). When the switch 210 is open, the switch 210 prevents a current flow between the alternator 160 and the output receptacle (e.g., receptacle 510).

Leads from the sensor unit 230 are coupled to the line and neutral of the alternator output 270. The sensor unit 230 detects and measures one or more parameters of the alternator output 270 and the output of the output receptacles 510, 520, 530. For example, the parameters may include at least one of voltage, current, frequency, etc., of the alternator 160 or the output receptacles 510, 520, 530. In some embodiments, other parameters such as power output, etc., may be determined based on the measured voltage and current. The sensor unit 230 outputs sensor signals 280 to the processor 240. The sensor signals 280 indicate a measured quantity of the at least one parameter.

In some embodiments, the processor 240 is implemented as a microprocessor with separate memory. In other embodiments, the processor 240 may be implemented as a microcontroller (with memory on the same chip). In other embodiments, the processor 240 may be implemented using multiple processors. In addition, the processor 240 may be implemented partially or entirely as, for example, a field-programmable gate array (FPGA), an applications specific integrated circuit (ASIC), etc., and a memory may not be needed or may be modified accordingly.

The transceiver 250 enables wired or wireless communication between the generator 100 and an electronic device 290 (that is, an external electronic device). In some embodiments, the transceiver 250 is a transceiver unit including separate transmitting and receiving components, for example, a transmitter and a receiver. The electronic device 290 is for example, a smart telephone, a tablet computer, a laptop computer, a desktop computer, etc. The generator 100 and the electronic device 290 may communicate over, for example, a Bluetooth® network, a Wi-Fi™ network, a ZigBee™ network, etc. In some embodiments, the transceiver 250 may also be directly coupled to the input/output interface 260 such that the transceiver 250 may be directly controlled by the input/output interface 260.

The input/output interface 260 may include one or more input mechanisms (for example, a touch pad, a keypad, a button, a knob, etc.), one or more output mechanisms (for example, a display, a speaker, etc.), or a combination thereof, or a combined input and output mechanism such as a touch screen. Particularly, the input/output interface 260 may include a display unit 450 (see FIG. 6) to display information to a user.

Figure 4:
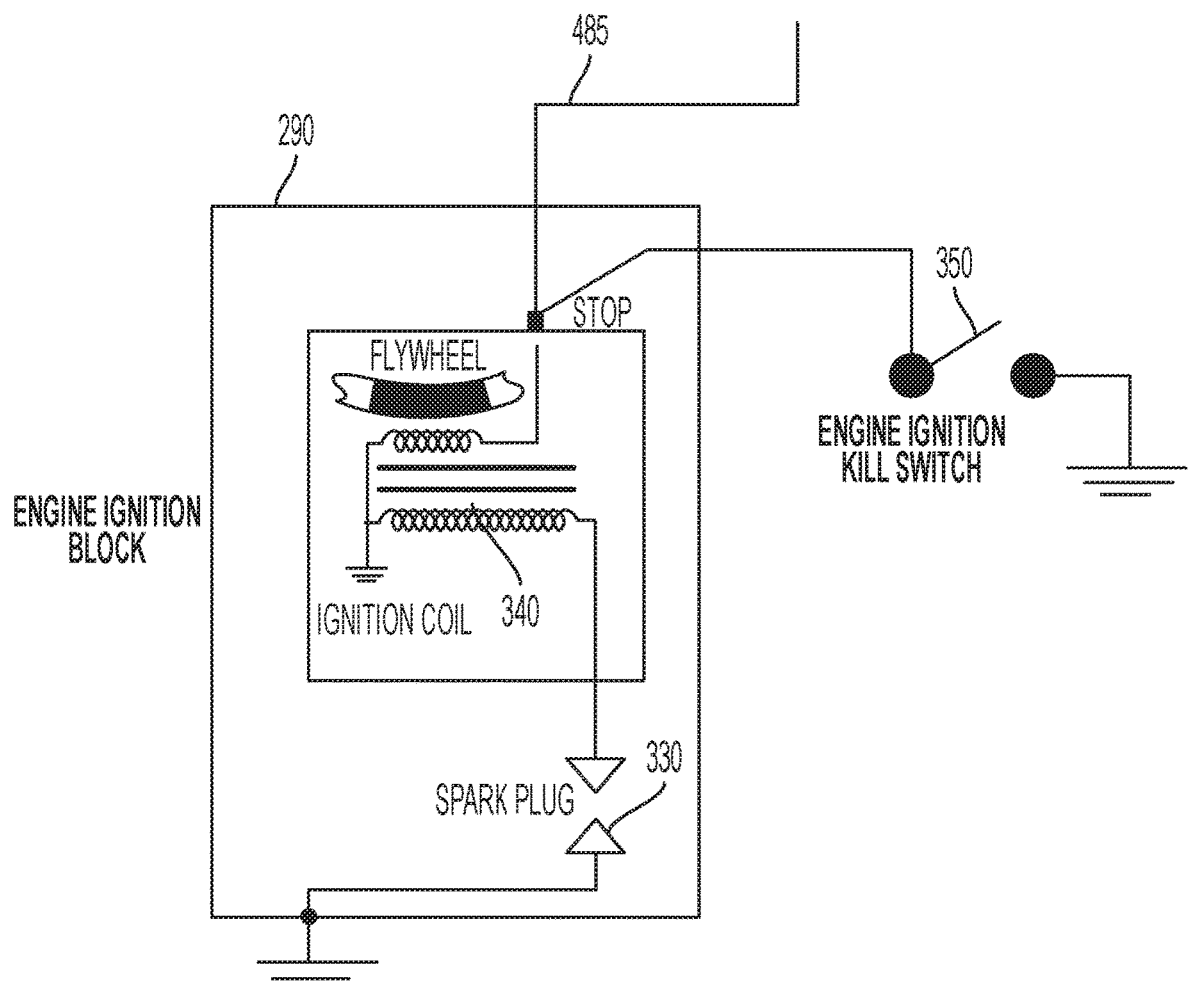
FIG. 4 is a block diagram of an engine ignition block of the generator of FIG. 1.

In the example illustrated, the generator 100 also includes an engine ignition block 295. The engine ignition block 295 controls the engine 150 to start and stop. The engine ignition block 295 may be controlled by the processor 240. Referring to FIG. 4, the engine ignition block 295 includes a spark plug 330 and an ignition coil 340. A push button (not shown) may be provided on the housing of the generator 100 that controls an engine ignition kill switch 350 to stop the engine 150. When a user pushes the push button to close the engine ignition kill switch 350, the engine ignition kill switch 350 couples the ignition coil 340 to ground, which cuts of the spark and the fuel supply to the engine 150. In some embodiments, the push button opens the ignition circuit to shut down the engine 150.

Figure 5:
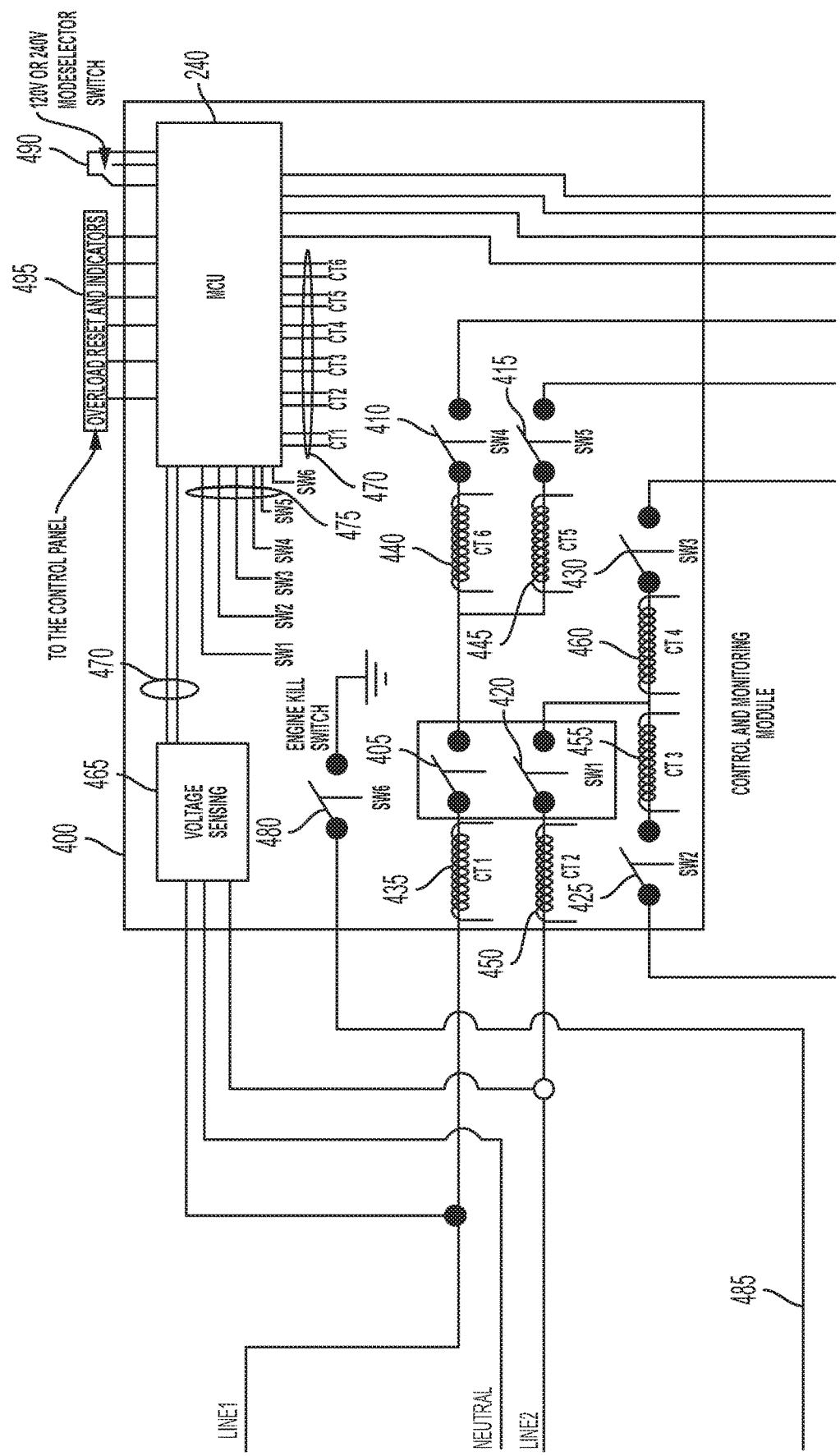
FIG. 5 is a block diagram of a control module of the generator of FIG. 1.

As shown in FIG. 5, the illustrated control module 400 includes the plurality of switches 210 (that is, switches 405, 410, 415, 420, 425, 430), a plurality of current transformers (that is, current transformers 435, 440, 445, 450, 455, 460), a voltage sensor 465, and the processor 240. The plurality of switches 210 includes a total of six switches, three each for LINE1 and LINE2.

LINE1 is connected to a first switch 405 through a first current transformer 435 and splits into two LINE1 outputs. LINE1 is provided to a first output receptacle 510 (see FIG. 6) through a second current transformer 440 and a second switch 410 and to a second output receptacle 520 through a third current transformer 445 and a third switch 415.

Similarly, LINE2 is connected to a fourth switch 420 through a fourth current transformer 450 and splits into two LINE2 outputs. LINE2 is provided to the second output receptacle 520 (see FIG. 6) through a fifth current transformer 455 and a fifth switch 425 and to a third output receptacle 530 through a sixth transformer 460 and a sixth switch 430.

As described above, the switches 405-430 may be implemented using MOSFETs, BJTs, relays, etc., and controlled to open or close by the processor 240. In some embodiments, the first switch 405 and the fourth switch 420 may be implemented using a single switch, for example, a double-throw switch.

The voltage sensor 465 is coupled to LINE1, LINE 2, and NEUTRAL to detect and measure output voltage of the alternator output 270 on each line. The current transformers 435-460 detect and measure output current on each line of the alternator output 270. The voltage sensor 465 and the current transformers 435-460 together form the sensor unit 230 of the generator 100. Sensor signals 470 indicating the measured quantity of the current and voltage are provided to the processor 240. Although only the voltage sensor 465 and the current transformers 435-460 are illustrated in FIG. 5, power output and frequency of the output receptacles may be detected and measured using one or the combination of outputs of the voltage sensor 465 and the current transformers 435-460. Based on the received sensor signals 470, the processor 240 controls the switches 405-430 using control signals 475.

In some embodiments, the control module 400 also includes an engine kill switch 480 coupled between an engine ignition block 295 and ground over a line 485. The engine kill switch 480 may be implemented using MOSFETs, BJTs, relays, etc., and controlled to open or close by the processor 240. In the example illustrated, the engine kill switch 480 is a normally open switch. The engine kill switch 480 couples the engine ignition block 295 and, particularly, the ignition coil 340 to ground when closed.

The illustrated control module 400 further includes a mode selector switch 490 operable between (e.g., switched or placed in) a first condition corresponding to a normal-power output mode and a second condition corresponding to a high-power output mode. For example, the mode selector switch 490 may be implemented as a knob that is movable between respective first and second positions. The processor 240 is coupled to the mode selector switch 490 and is configured to determine the condition of the mode selector switch 490. The mode selector switch 490 allows a user to select between a 120V only, normal-power output operation mode and a 240V only high-power output operation mode. In some embodiments, the mode selector switch 490 may also allow the user to select a combination mode in which the generator 100 provides both the 120V and the 240V output.

In some embodiments, the mode selector switch 490 is implemented as a one position pushbutton switch that may be depressed to switch between the normal-power output operation mode and the high-power output operation mode. The processor 240 determines that the pushbutton is depressed and toggles the operating mode of the power generator 100 in response to determining that the pushbutton is depressed.

The illustrated control module 400 communicates with an overload reset and indicators block 495 of a control panel. The overload reset and indicators block 495 includes overload indicators and reset buttons as discussed in detail below.

Figure 6:
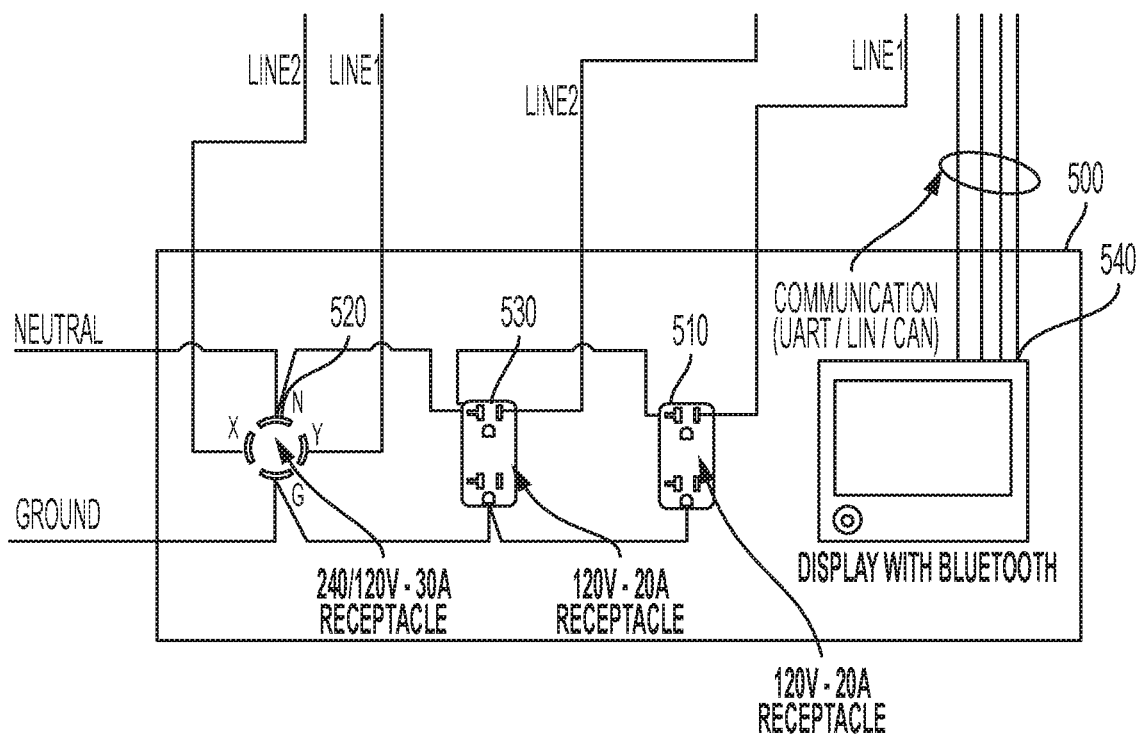
FIG. 6 is a block diagram of a control panel of the generator of FIG. 1.

As shown in FIG. 6, the illustrated control panel 500 includes a number of output receptacles (e.g., a first output receptacle 510, a second output receptacle 520, a third output receptacle 530) and a display unit 540. In the illustrated construction, the first output receptacle 510 and the third output receptacle 530 are "120" Volts-"20" Amperes ground fault circuit interrupter (GFCI) outlets, and the second output receptacle 520 is a "120/240" Volt-"30" Amperes NEMA L14-30 receptacle. In other constructions (not shown), other types of receptacles may also be used.

As described above, the first output receptacle 510 receives LINE through switches 405 and 410. The third output receptacle 530 receives LINE2 through switches 420 and 425. The second output receptacle 520 receives LINE1 through switches 405 and 415 and LINE2 through switches 420 and 430 for dual operation. The output receptacles 510-530 also receive NEUTRAL and GROUND from the alternator 160.

The display unit 540 may be, for example, a liquid crystal display (LCD), a light-emitting diode display (LED), etc. The display unit 540 is coupled to the processor 240 by universal asynchronous receiver-transmitter (UART), local interconnect network (LIN), controller area network (CAN) connection, etc. The display unit 540 displays the information provided by the processor 240 to users of the generator 100.

As mentioned above, the control panel 500 may also include an overload reset and indicators block 495 having overload indicators and a reset button. The overload indicators indicate an overload state of an output receptacle 510-530. For example, the overload indicators may include an LED indicator provided in proximity to each output receptacle 510-530 to indicate a status of the corresponding output receptacle. Similarly, a reset button may be provided in proximity to each output receptacle 510-530 to reset the corresponding output receptacles 510-530.

Figure 7:
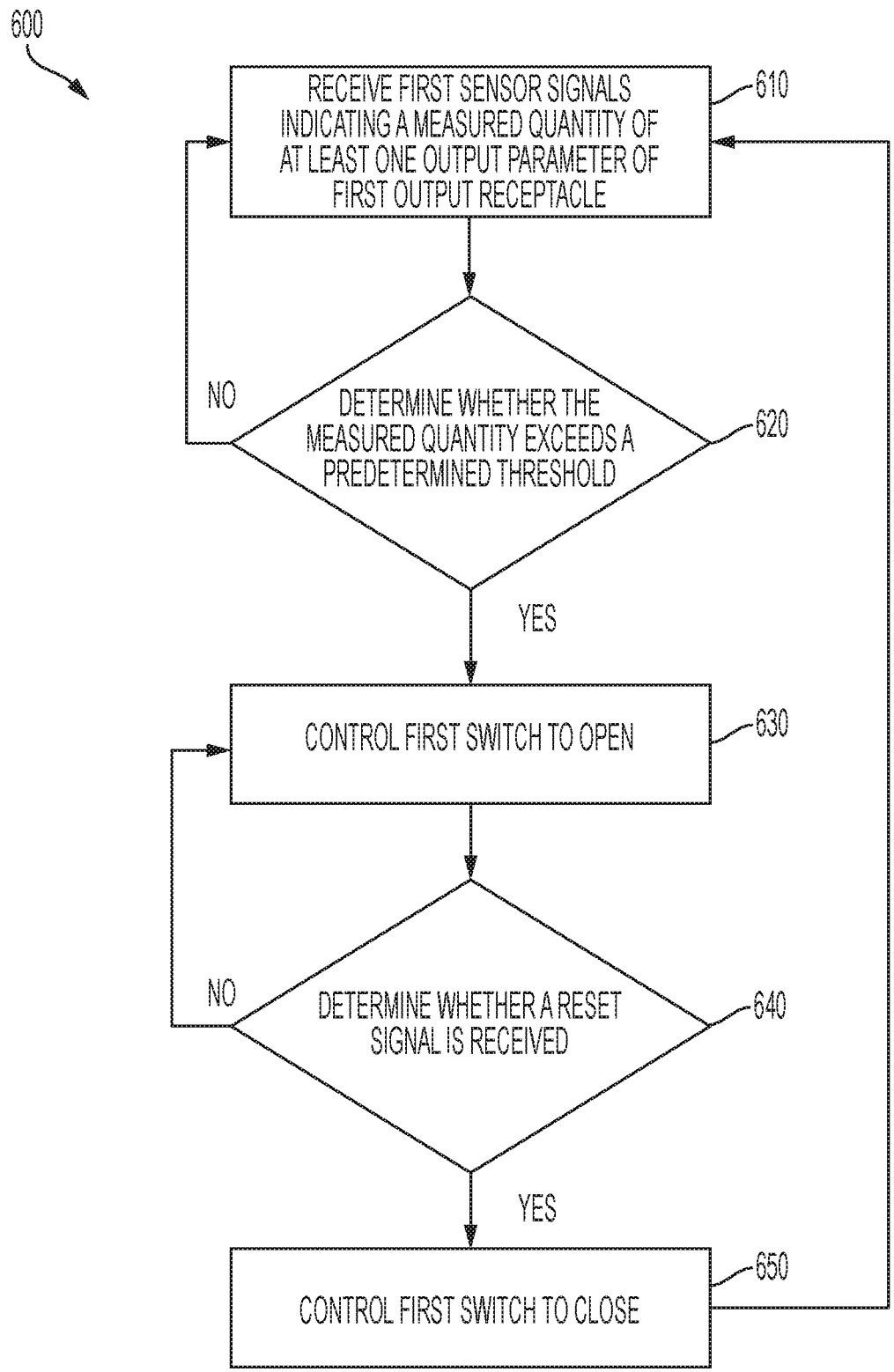
FIG. 7 is a flowchart illustrating a method of operating the generator of FIG. 1.

FIG. 7 is a flowchart illustrating an example method 600 of operating the generator 100 executed by the processor 240. In the example illustrated, the method 600 includes receiving, at the processor 240 from the sensor unit 230, first sensor signals indicating a measured quantity of the at least one output parameter of the first output receptacle 510 (at block 610). As described above, the sensor unit 230 may measure the output current, the output voltage, the frequency, the output power, etc., of each output receptacle 510-530. The sensor unit 230 provides sensor signals 280 indicating the measured quantity of the output parameter(s) to the processor 240.

The method 600 also includes determining, using the processor 240, whether the measured quantity exceeds a predetermined threshold (at block 620). The predetermined threshold may be a factory set threshold or a user set threshold. The processor 240 may implement a comparator to compare the measured quantity to the predetermined threshold. As such, the processor 240 determines whether there is a fault condition (e.g., over-voltage, over-current, low voltage, low frequency, etc.) on the generator 100 based on the sensor signals 280 received from the sensor unit 230.

The user may set the predetermined threshold, for example, on the control panel 500 of the generator 100 or on the electronic device 290. For example, the user may set the predetermined threshold on an application (e.g., smartphone application) on the electronic device 290. The electronic device 290 then provides the predetermined threshold to the processor 240 via the transceiver 250.

The method 600 further includes controlling, using the processor 240, the first switch (i.e., switch 410) to open in response to determining that the measured quantity exceeds the predetermined threshold (at block 630). When the switch 410 is opened, the power supply to the first output receptacle 510 is removed, thereby effectively removing the fault condition from the generator 100. The processor 240 may open the first switch (i.e., switch 410) while still keeping the other switches (i.e., switches 405 and 415-430) closed such that the other output receptacles 520, 530 still provide power to the devices connected to them.

All switches 405-430 may be controlled similarly, as described above, by the processor 240. Accordingly, the processor 240 may protect the generator 100 from fault conditions by individually controlling the power supply to each of the output receptacles 510-530.

In some embodiments, the measured quantity of the output parameter(s) may be displayed on the display unit 450 or a display of the electronic device 290. The processor 240 may control the display unit 450 to display measured quantities of the output parameter(s) for each output receptacle 510-530. For example, the processor 240 displays, on the display unit 450 of the generator 100, the measured quantity of the at least one output parameter of the first output receptacle 510. The display unit 450 may also be controlled to display the status of each switch 405-430 and/or the status of each output receptacle 510-530. Additionally or alternatively, as described above, the LED indicators may be controlled by the processor 240 to indicate a status of the corresponding output receptacles 510-530. For example, when a parameter of the first output receptacle 510 exceeds a predetermined threshold (i.e., the first output receptacle 510 is overloaded), the processor 240 may control the LED indicator corresponding to the first output receptacle 510 to emit a light to indicate to a user that the first output receptacle 510 is overloaded.

The processor 240 may also provide, via the transceiver 250, data signals indicating a status of each switch 405-430 to the electronic device 290. The electronic device 290 displays the status of each switch 405-430 and/or the status of each output receptacle 510-530. The status may indicate whether the switches 405-430 are open or closed and/or whether the output receptacles 510-530 are connected to the alternator output 270. In addition, the processor 240 may further provide, via the transceiver 250, data signals indicating the measured quantity of the output parameter(s) of the output receptacles 510-530 to the electronic device 290. The electronic device 290 displays the measured quantities on a display unit of the electronic device 290.

The electronic device 290 may also be used to control the power output to the output receptacles 510-530. The method 600 optionally includes resetting the power generator 100 through the electronic device 290 or the reset buttons. That is, when the first switch is controlled to close, the method 600 includes determining, using the processor, whether a reset signal is received (at block 640). The reset signal may be received either from the electronic device 290 or the reset buttons. The method 600 further includes controlling, with the processor 240, the first switch to close (at block 650) in response to receiving the reset signal.

For example, the processor 240 may receive, via the transceiver 250, a control signal instructing the processor 240 to close the first switch (i.e., switch 410) from the electronic device 290. The electronic device 290 sends the control signal in response to a user input received at the electronic device 290. The processor 240 may control the first switch (i.e., switch 410) to close in response to receiving the control signal from the electronic device 290.

Additionally or alternatively, the reset buttons may be used to reset the power output to the output receptacles 510-530. For example, when the first switch (i.e., switch 410) is opened to cut-off the power supply to the output receptacle 510, a user may actuate the reset button corresponding to the first output receptacle 510 to reset the first output receptacle 510. When the reset button corresponding to the first output receptacle 510 is actuated, the reset button signals the processor 240 to reset the first output receptacle 510. The processor 240 closes the first switch (i.e., switch 410) in response to receive the reset signal from the reset button corresponding to the first output receptacle 510.

Similarly, the processor 240 may receive, via the transceiver 250, a control signal instructing the processor 240 to open the first switch (i.e., switch 410) from the electronic device 290. The processor 240 controls the first switch (i.e., switch 410) to open in response to receiving the control signal from the electronic device 290.

Accordingly, when the generator 100 removes output power to an output receptacle 510-530 due to a fault condition, the user need not go to the generator 100 to reset the output receptacles 510-530. Rather, the user may use the electronic device 290 to reset the output receptacles 510-530 in addition to individually controlling the output receptacles 510-530. When the reset signal is not received, the method 600 includes keeping the first switch open. After the first switch is closed in response to receiving the reset signal, the method 600 returns to block 610 to monitor the sensor signals.

In some embodiments, a ground fault current interrupter system may also be implemented using the control module 400. The processor 240 may continuously monitor the current flowing through LINE1, LINE2, and NEUTRAL. When there is a mismatch between the current flowing through LINE1, LINE2, and NEUTRAL, the processor 240 may disconnect the output receptacles 510-530. The processor 240 may disconnect the output receptacles 510-530 by opening switches 405, 420, which, in some embodiments, may be implemented using a single switch, as described above.

Figure 8:
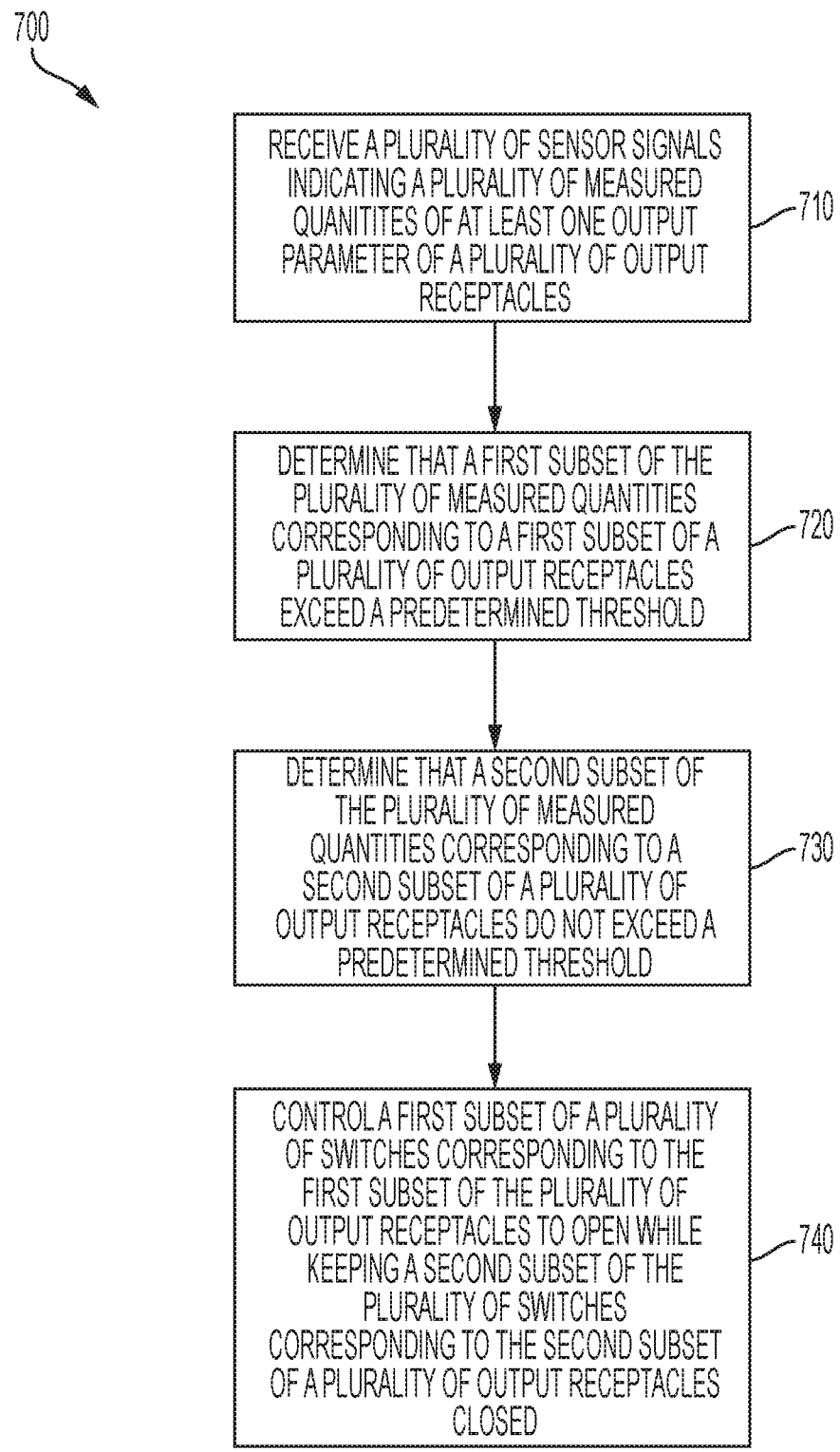
FIG. 8 is a flowchart illustrating a method of operating the generator of FIG. 1.

FIG. 8 is a flowchart illustrating an example method 700 of operating the generator 100 executed by the processor 240. In the example illustrated, the method 700 includes receiving, at the processor 240 from the sensor unit 230, a plurality of sensor signals 280 indicating a plurality of measured quantities of at least one output parameter of the plurality of output receptacles 510-530 (at block 710). The sensor unit 230 provides the measured quantities of the at least one parameter of each of the output receptacles 510-530 to the processor 240. The processor 240 may continuously receive the sensor signals 280 or may receive the sensor signals 280 at certain intervals, for example, every 1 millisecond. The processor 240 compares the measured quantities to a predetermined threshold after receiving the sensor signals 280.

The method 700 also includes determining, using the processor 240, that a first subset of the plurality of measured quantities corresponding to a first subset of a plurality of output receptacles (e.g., output receptacles 510, 520) exceed a predetermined threshold (at block 720). The measured quantity may exceed the predetermined threshold for various reasons. For example, a power tool or other electrical device connected to an output receptacle 510-530 may draw excess current causing the measured current of the output receptacle 510-530 to exceed the predetermined threshold.

In some embodiments, the processor 240 may use different thresholds for different output receptacles 510-530. For example, the current threshold for the "20 A" first output receptacle 510 may be 25 A while the current threshold for the "30 A" second output receptacle 520 may be 35 A.

The method 700 further includes determining, using the processor 240, that a second subset of the plurality of measured quantities corresponding to a second subset of plurality of output receptacles (for example, third output receptacle 530) does not exceed the predetermined threshold (at block 730). Accordingly, the processor 240 continuously monitors the output receptacles 510-530 to determine which output receptacles 510-530 have a fault condition (e.g., over-voltage, over-current, low voltage, low frequency, etc.).

The method 700 also includes disabling the first plurality of receptacles (e.g., output receptacles 510, 520) in response to determining that the first subset of the plurality of measured quantities exceeds the predetermined threshold (at block 740). To do so, the method includes controlling, using the processor 240, a first subset of the plurality of switches 210 corresponding to the first subset of the plurality of output receptacles (e.g., output receptacles 510, 520) to open. The processor 240 opens the first subset of the plurality of switches (e.g., switches 410, 415, 425) in response to determining that the first subset of the plurality of measured quantities exceeds the predetermined threshold. Thereby, the processor 240 disables the first subset of the plurality of output receptacles (e.g., output receptacles 510, 520).

Because the second subset of the plurality of measured quantities corresponding to the second subset of plurality of output receptacles (for example, third output receptacle 530) do not exceed the predetermined threshold, the processor 240 keeps the second subset of the plurality of switches (e.g., switch 430) corresponding to the second subset of the plurality output receptacles (e.g., third output receptacle 530) closed. Accordingly, the second subset of the plurality output receptacles (e.g., third output receptacle 530) are still enabled.

Figure 9:
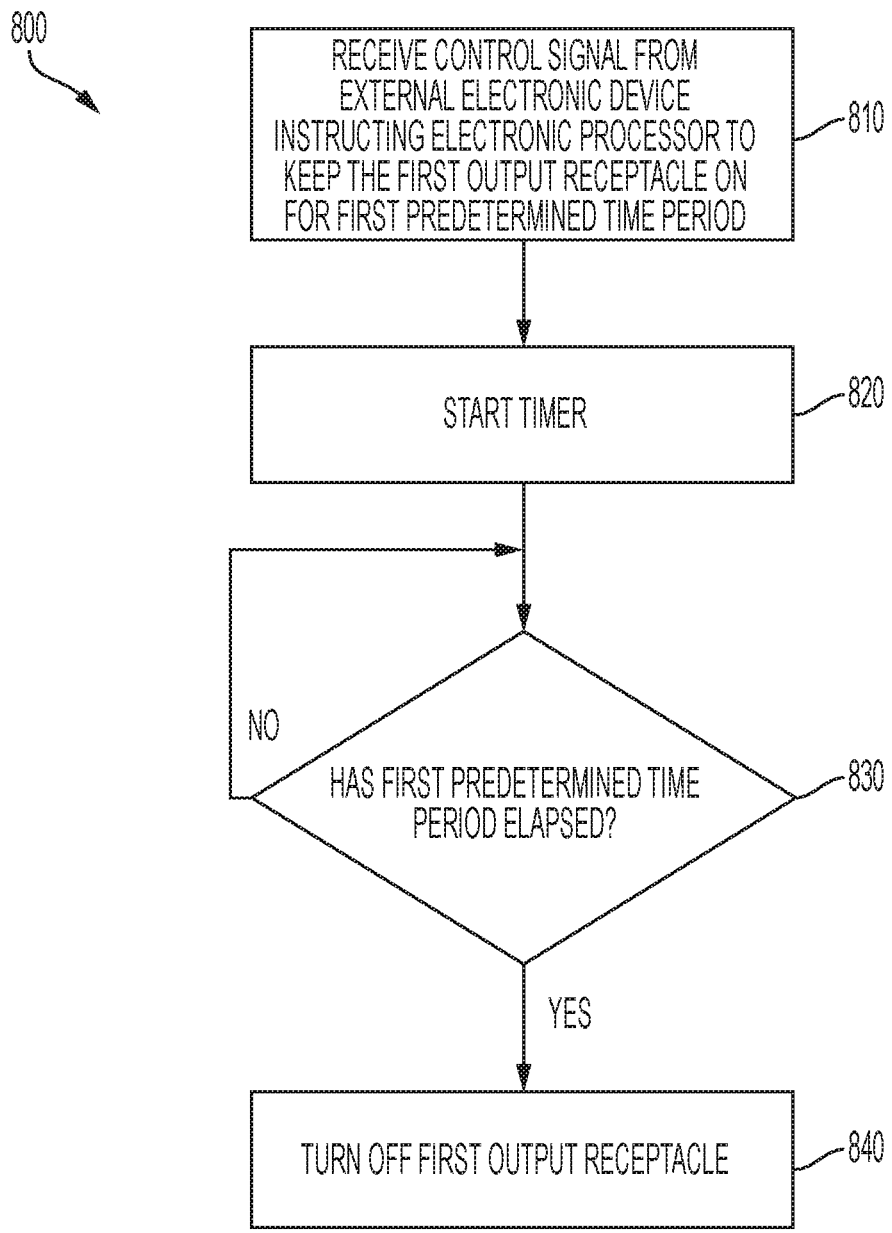
FIG. 9 is a flowchart illustrating a method of operating the generator of FIG. 1.

FIG. 9 is a flowchart illustrating an example method 800 of operating the generator 100 performed by the processor 240. The method 800 allows for a timed control of the output receptacles 510-530. In the illustrated example, the method 800 includes receiving, at the processor 240 via the transceiver 250, a control signal from the external electronic device 290 instructing the processor 240 to keep the first output receptacle 510 ON for a first predetermined time period (at block 810). The external electronic device 290 may thus be used for timed control of the output receptacles 510-530.

In one example, the external electronic device 290 may be used to control the first output receptacle 510 to be turned ON for a first predetermined time period (e.g., 2 hours) and turned OFF after the first predetermined time period. A user may use the user interface of the external device 290 to select the output receptacle 510-530 to be controlled and the amount of time for which the output receptacles 510-530 should be turned ON/OFF. The electronic device 290 then sends the control signals to the generator 100 indicating the output receptacle(s) 510-530 to be controlled and the first predetermined time period for which the selected output receptacle should be turned ON/OFF. The processor 240 receives the control signals from the electronic device 290 via the transceiver 250.

The method 800 includes starting, using the processor 240, a timer in response to receiving the control signals from the external electronic device 290 (at block 820). The processor 240 may set the timer (or a counter) to the first predetermined time period. The processor 240 may also additionally turn ON the first output receptacle 510 by closing the first switch (i.e., switch 410) when it determines that the first output receptacle 510 is turned OFF when the control signal from the electronic device 290 is received. The method 800 further includes determining whether the first predetermined time period has elapsed (at block 830).

At the end of the first predetermined time period, that is, when the timer indicates that the first predetermined time period has elapsed, the method 800 includes turning OFF, using the processor 240, the first output receptacle 510 (at block 840). The processor 240 opens the first switch (i.e., switch 410) to turn OFF the first output receptacle 510 at the end of the first predetermined time period.

In some embodiments, the user may control the first output receptacle 510 to turn ON for the first predetermined time period and turn off for a second predetermined time period before turning the first output receptacle 510 back ON (e.g., ON for 2 hours and OFF for 1 hour). In these embodiments, the control signal further instructs the processor 240 to keep the first output receptacle 510 OFF for a second predetermined time period after the first output receptacle 510 is kept ON for the first predetermined time period. The processor 240 starts a second timer after the first output receptacle 510 is turned OFF (at block 840). The processor 240 may set the second timer to the second predetermined time period.

At the end of the second predetermined time period, that is, when the second timer indicates that the second predetermined time period has elapsed, the processor 240 turns OFF the first output receptacle 510. The processor 240 closes the first switch (i.e., switch 410) to turn ON the first output receptacle 510 at the end of the second predetermined time period. Although the above methods 600, 800 are described with respect to the first output receptacle 510, the method 600, 800 may also be used to control any output receptacle of the generator 100.

Figure 10:
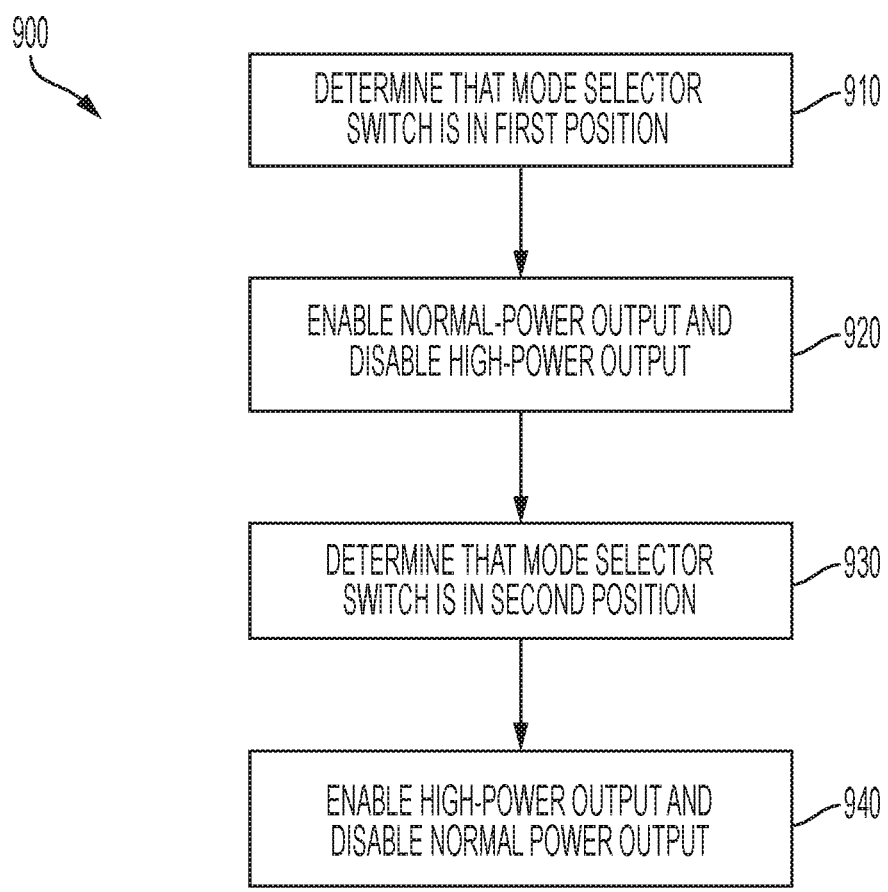
FIG. 10 is a flowchart illustrating a method of operating the generator of FIG. 1.

FIG. 10 is a flowchart illustrating an example method 900 of operating the generator 100 performed by the processor 240. The method 900 allows for a mode selection for the generator 100. The generator 100 may be configured to operate in two or more modes. In a first mode, also referred to as the normal-power mode, the generator 100 may provide a power output only at normal voltage and current. That is, the generator 100 provides power output through output receptacles 510 and 530 and disables power output through output receptacle 520. In a second mode, also referred to as the high-power mode, the generator 100 may provide a power output only at high voltage and current. That is, the generator 100 provides power output through output receptacle 520 and disables power output through output receptacles 510 and 530.

In the example of FIG. 6, the normal voltage and current is set to 120V and 20 A, and the high voltage and current is set to 240V and 30 A. However, other configurations of normal-power and high-power may be also be possible based on the requirements of the locality such that the high-power output receptacle(s) 520 provides higher voltage and/or current than normal-power output receptacle 510, 530. The mode selector switch 490 may be moved between the first position and the second position to select between the first mode and the second mode, respectively.

Returning to FIG. 10, the illustrated method 900 includes determining, using the processor 240, that the mode selector switch 490 is in the first position (at block 910). The processor 240 may determine that the mode selector switch 490 is in the first position based on a signal received from the mode selector switch 490. For example, the mode selector switch 490 may provide an interrupt signal to the processor 240 when the mode selector switch 490 is moved from the second position to the first position or from the first position to the second position.

The method 900 also includes enabling, using the processor 240, normal-power output and disabling high-power output of the generator 100 in response to determining that the mode selector switch 490 is in the first position (at block 920). The processor 240 may open switches 415 and 425 (e.g., second switch) to disable power output through the second output receptacle 520 while keeping the other switches 405, 410, 420, 430 (e.g., first switch) closed to enable power through output receptacles 510 and 530.

The method 900 further includes determining, using the processor 240, that the mode selector switch 490 is in the second position (at block 930). The processor 240 may determine that the mode selector switch 490 is in the second position based on a signal received from the mode selector switch 490. For example, as described above, the mode selector switch 490 may provide an interrupt signal to the processor 240 when the mode selector switch 490 is moved from the second position to the first position or from the first position to the second position.

The method 900 also includes enabling, using the processor 240, high-power output and disabling normal-power output of the generator 100 in response to determining that the mode selector switch 490 is in the second position (at block 940). The processor 240 may open switches 405, 415, 420, 425 (e.g., first switch) to disable power output through the output receptacle 510 and 530 while keeping the other switches 410 and 430 (e.g., second switch) open to enable power through the second output receptacles 520.

Figure 11:
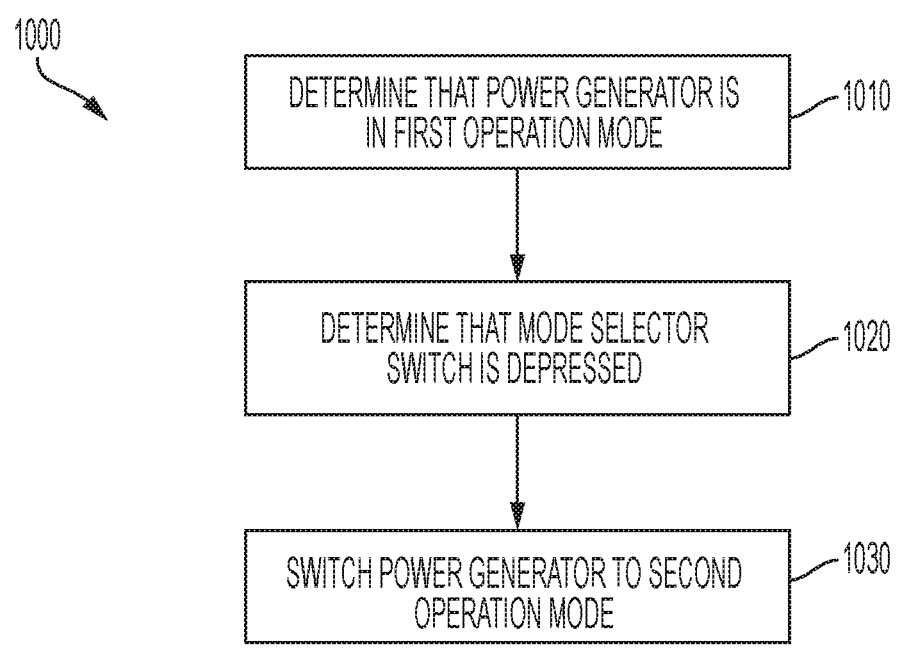
FIG. 11 is a flowchart illustrating a method of operating the generator of FIG. 1.

FIG. 11 is a flowchart illustrating an example method 1000 of operating the generator 100 performed by the processor 240. In the example illustrated, the method 1000 includes determining, using the processor 240, that the power generator 100 is in a first operation mode (at block 1010). For example, the processor 240 may determine that the power generator 100 is in the normal-power output mode. The processor 240 determines the operating state of the power generator 100 by, for example, storing an operation state flag in a memory. The method 1000 also includes determining, using the processor 240, that a mode selector switch 490 is depressed (at block 1020). The processor 240 may determine that the mode selector switch 490 is depressed based on a signal received from the mode selector switch 490. For example, the mode selector switch 490 may provide an interrupt signal to the processor 240 when the mode selector switch 490 is depressed.

The method 1000 further includes switching, using the processor 240, the power generator 100 to the second operation mode in response to determining that the mode selector switch 490 is depressed (at block 1030). For example, the processor 240 switches the operating mode of the power generator 100 from the normal-power output mode to the high-power output mode in response to a depression of the mode selector switch 490. The processor 240 switches between the normal-power output mode and the high-power output mode by enabling and disabling the normal-power output and the high-power output as described above.

Figure 12:
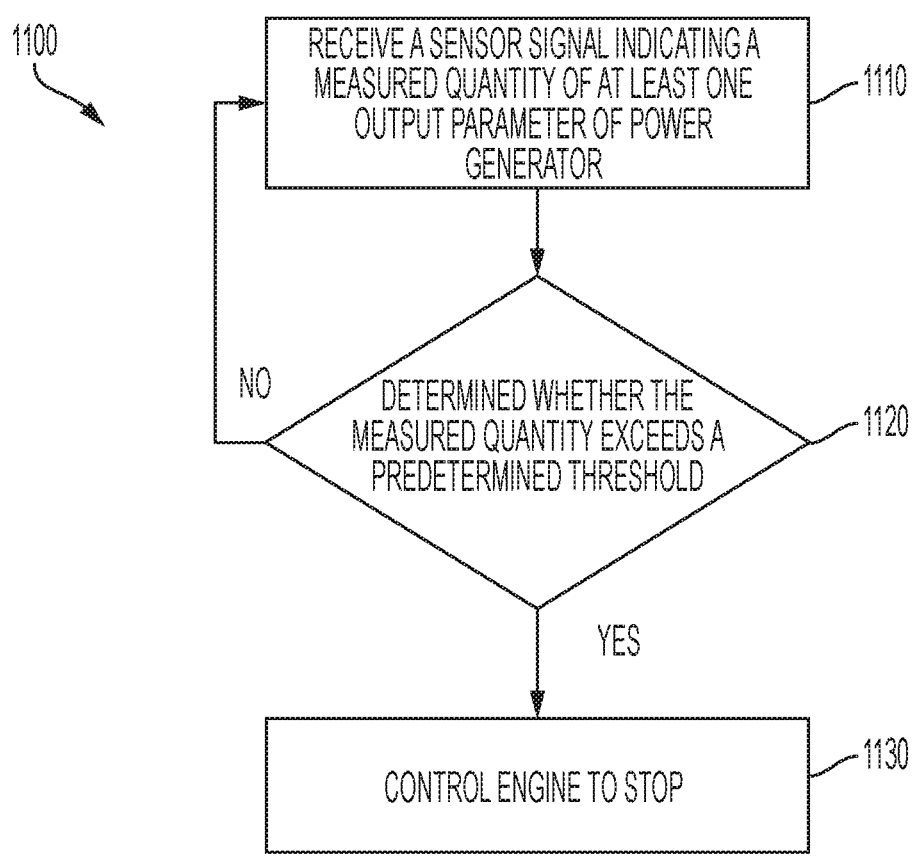
FIG. 12 is a flowchart illustrating a method of operating the generator of FIG. 1.

FIG. 12 is a flowchart illustrating an example method 1100 of operating the generator 100 performed by the processor 240. The method 1100 allows for controlling the engine of the generator 100 based on the sensor signals 470. In the example illustrated, the method 1100 includes receiving, at the processor 240 from the sensor unit 230, a sensor signal indicating a measured quantity of the at least one output parameter of the generator 100 (at block 1110). As described above, the sensor unit 230 may measure the output current, the output voltage, the frequency, the output power, etc., of each output receptacle 510-530. The sensor unit 230 provides sensor signals 280 indicating the measured quantity of the output parameter(s) to the processor 240.

The method 1100 also includes determining, using the processor 240, whether the measured quantity exceeds a predetermined threshold (at block 1120). The predetermined threshold may be a factory set threshold or a user set threshold. The processor 240 may implement a comparator to compare the measured quantity to the predetermined threshold. As such, the processor 240 determines whether there is a fault condition (e.g., over-voltage, over-current, low voltage, low frequency, etc.) on the generator 100 based on the sensor signals 280 received from the sensor unit 230. The overload condition may be removed via the switches of the overload reset and indicators block 495 or via a command from the electronic device 290.

The user may set the predetermined threshold, for example, on the control panel 500 of the generator 100 or on the electronic device 290. For example, the user may set the predetermined threshold on an application (e.g., a smartphone application) on the electronic device 290. The electronic device 290 then provides the predetermined threshold to the processor 240 via the transceiver 250.

The method 1100 further includes controlling, using the processor 240, the engine 150 to stop in response to determining that the measured quantity exceeds the predetermined threshold (at block 1130). The processor 240 may close the engine kill switch 480 to ground the ignition coil 340 of the engine ignition block 295. The engine ignition block 295 stops the engine 150 when the ignition coil 340 is grounded by cutting off the spark and the fuel supply to the engine 150.

The electronic device 290 may also be used to stop the engine 150. For example, the processor 240 may receive, via the transceiver 250, a control signal from the electronic device 290 instructing the processor 240 to stop the engine 150. The electronic device 290 sends the control signal in response to a user input received at the electronic device 290. The processor 240 may control the engine kill switch 480 to close in response to receiving the control signal from the electronic device 290.

Figure 13:
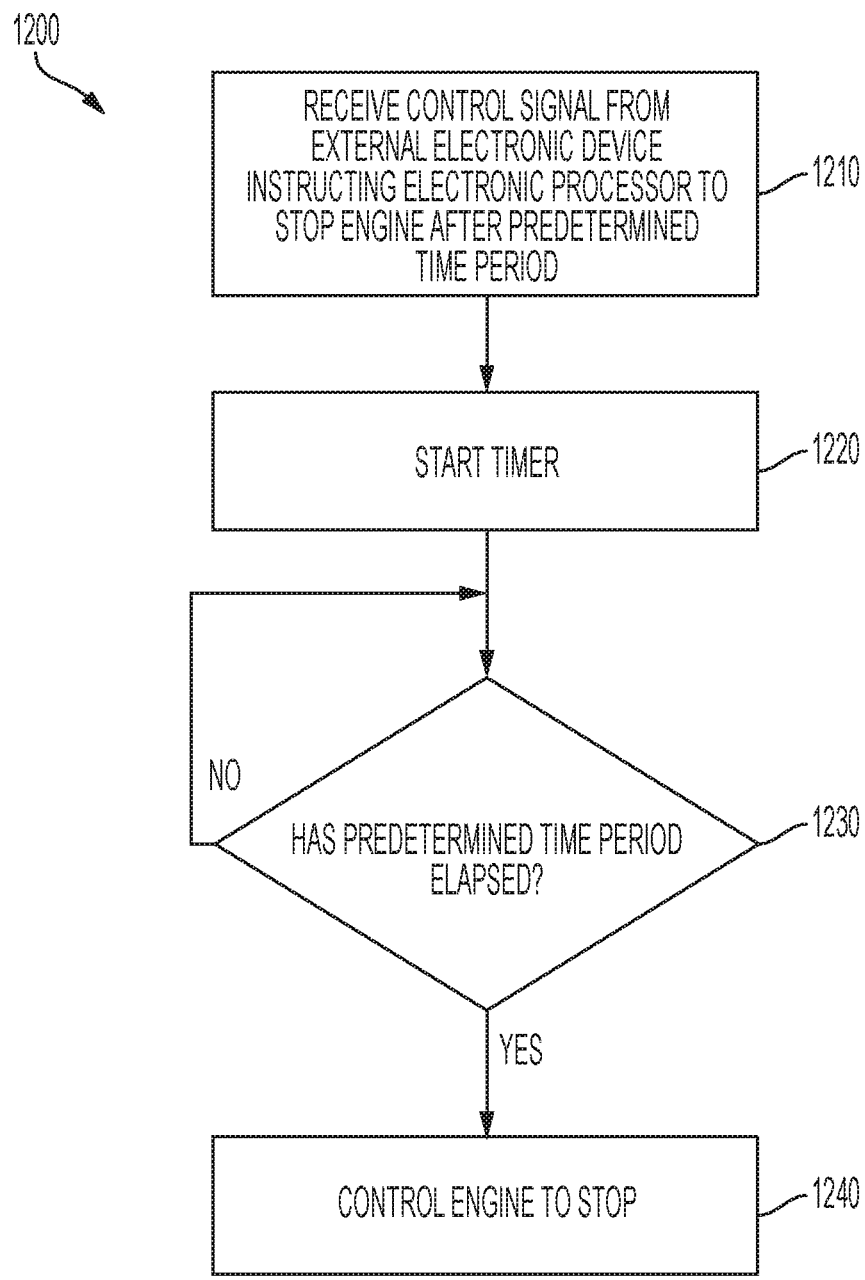
FIG. 13 is a flowchart illustrating a method of operating the generator of FIG. 1.

FIG. 13 is a flowchart illustrating an example method 1200 of operating the generator 100 performed by the processor 240. The method 1200 allows for timed control of the engine of the generator 100. The illustrated method 1200 includes receiving, at the processor 240 via the transceiver 250, a control signal from the external electronic device 290 instructing the processor 240 to stop the engine 150 after a predetermined time period (at block 1210). The external electronic device 290 may be used for timed control of the engine 150.

For example, the external electronic device 290 may be used to stop the engine 150 after the predetermined time period. A user may use the user interface of the external device 290 to select the predetermined time period. The electronic device 290 then sends the control signals to the generator 100 indicating the predetermined time period after which the engine 150 should be stopped. The processor 240 receives the control signals from the electronic device 290 via the transceiver 250.

The method 1200 includes starting, using the processor 240, a timer in response to receiving the control signals from the external electronic device 290 (at block 1220). The processor 240 may set the timer to the predetermined time period. The method 1200 further includes determining whether the predetermined time period has elapsed (at block 1230).

At the end of the predetermined time period, that is, when the timer indicates that the predetermined time period has elapsed, the method 1200 includes controlling, using the processor 240, the engine 150 to stop in response to determining that the predetermined time period has elapsed (at block 1240). As described above, the processor 240 may close the engine kill switch 480 to ground the ignition coil 340 of the engine ignition block 295. The engine ignition block 295 stops the engine 150 when the ignition coil 340 is grounded by cutting off the spark and the fuel supply to the engine 150. The processor 240 controls the engine 150 without an intervention from the external electronic device 290 at the end of the predetermined time period. In some embodiments, the external electronic device 290 may be used to turn off the engine 150 immediately. The processor 240 receives the control signal instructing the processor 240 to stop the engine 150. The processor 240 stops the engine 150 in response to receiving the control signal from the external electronic device 290.

In some embodiments, the control module 400 may store an overload chart (e.g., overload look-up table) in a memory. The overload chart may store a mapping between a plurality of parameter thresholds and a plurality of time periods such that, for each parameter threshold of the plurality of parameter thresholds, there is a corresponding time period. The parameter thresholds are, for example, overload thresholds such that the generator 100 allows an output receptacle 510-530 to provide output power at or over the parameter threshold for the time period corresponding to the parameter threshold. For example, for a current threshold of 20 A for the first output receptacle 510, the processor 240 may allow a power output through the first output receptacle 510 at 21 A for 30 minutes, at 22 A for 15 minutes, at 23 A for 5 minutes, at 24 A for 1 minute, at 25 A for 10 seconds, etc.

Figure 14:
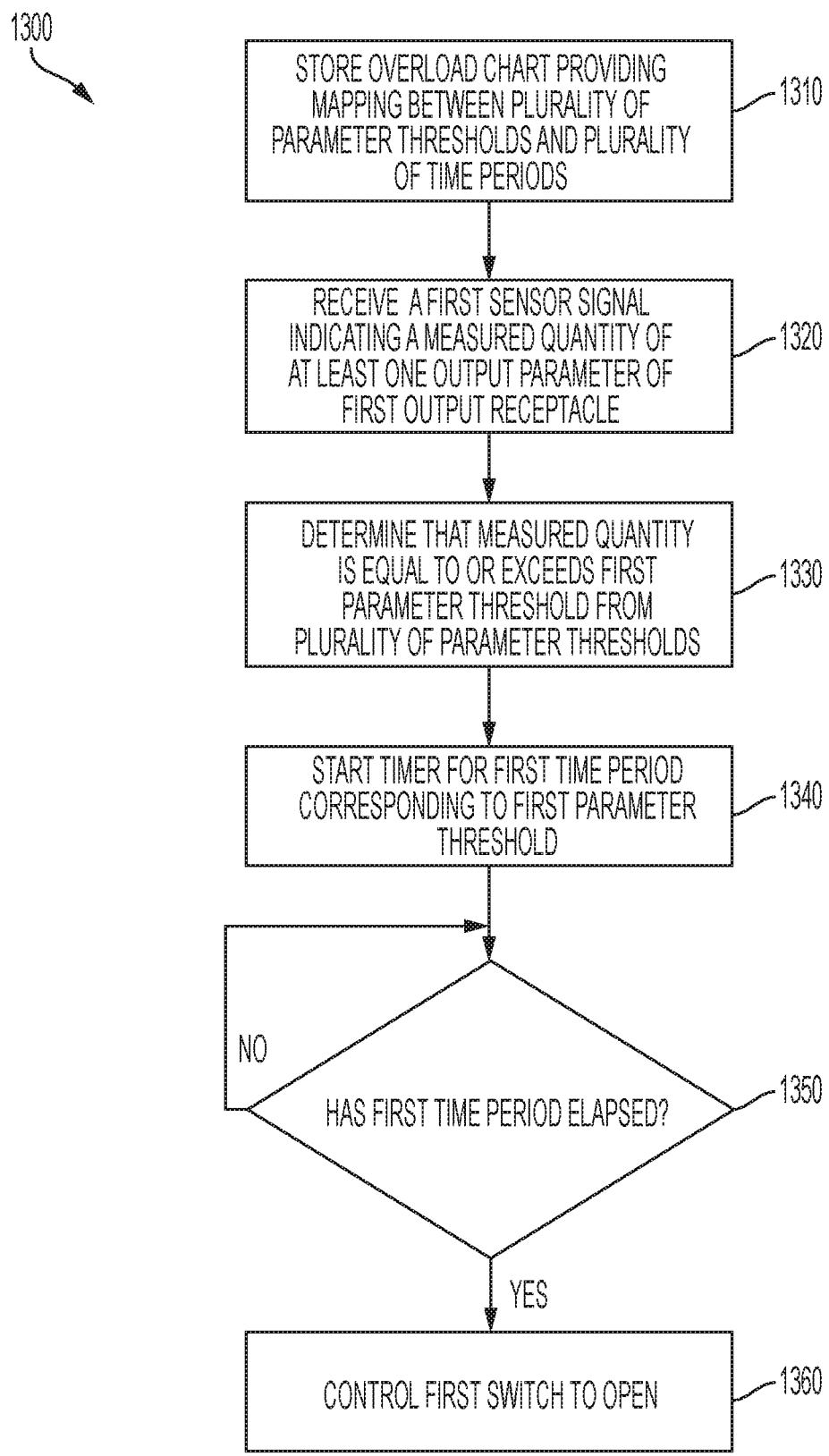
FIG. 14 is a flowchart illustrating a method of operating the generator of FIG. 1.
Figure 15:
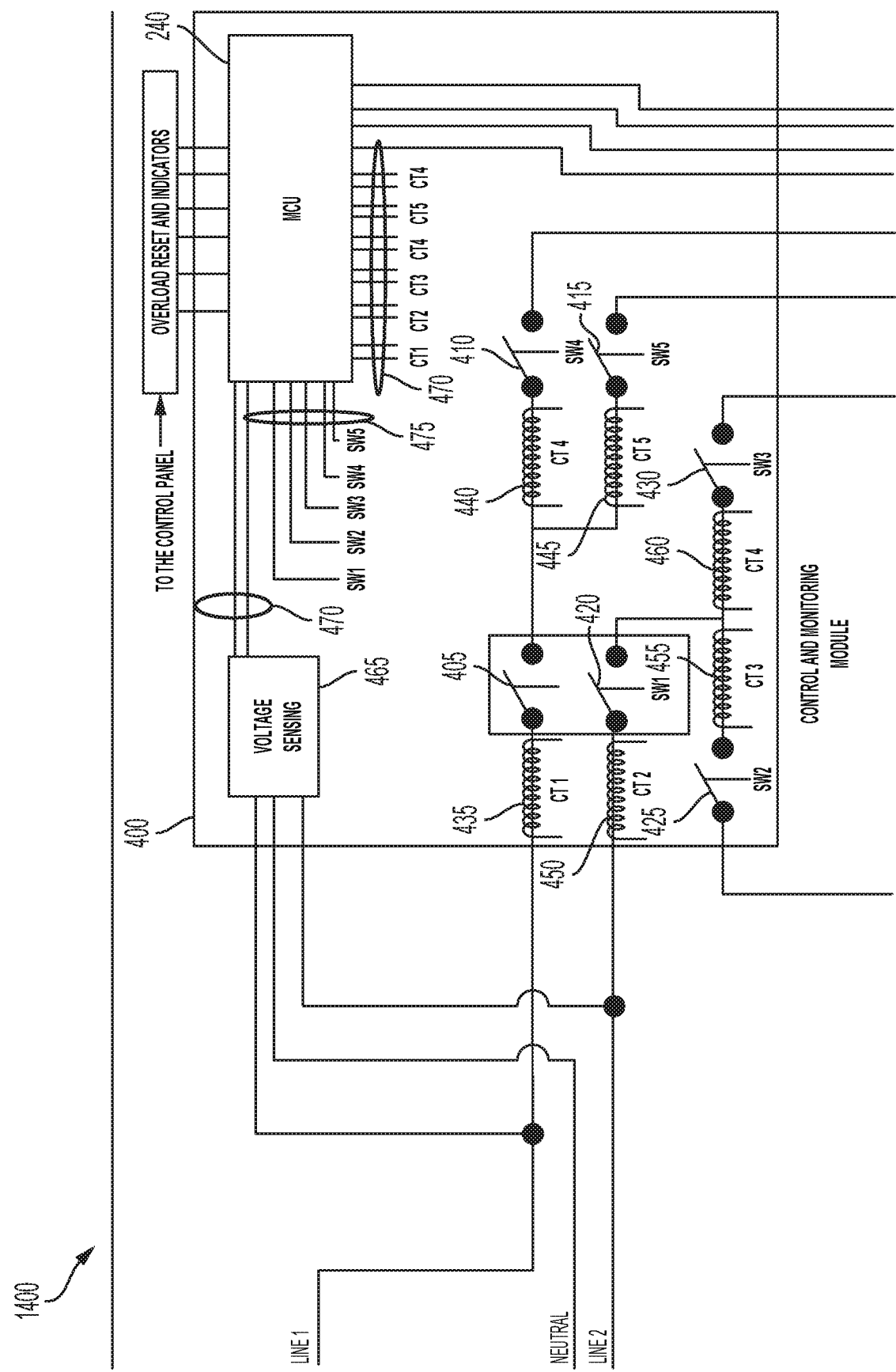
FIG. 15 is a block diagram of a control module of a power adapter.

FIG. 14 is a flowchart illustrating an example method 1300 of operating the generator 100 performed by the processor 240 in accordance with the overload chart stored in the memory. The method 1300 is described with respect to the first output receptacle 510. However, the method 1300 may be used to control any output receptacle 510-530.

The illustrated method 1300 includes storing, in a memory, the overload chart providing a mapping between the plurality of parameter thresholds and the plurality of time periods (at block 1310). The method 1300 also includes receiving, at the processor 240 from the sensor unit 230, a first sensor signal indicating a measured quantity of the at least one output parameter of the first output receptacle 510 (at block 1320). As described above, the sensor unit 230 may measure the output current, the output voltage, the frequency, the output power, etc., of each output receptacle 510-530. The sensor unit 230 provides sensor signals 280 indicating the measured quantity of the output parameter(s) to the processor 240.

The method 1300 also includes determining, using the processor 240, whether the measured quantity is equal to or exceeds a first parameter threshold from the plurality of parameter thresholds (at block 1330). The processor 240 may implement a comparator to compare the measured quantity to each of the plurality of parameter thresholds to determine whether and which parameter threshold the measured quantity is equal to or exceeds. If a quantity exceeds a parameter threshold (e.g., an overload occurs), the condition may be removed via the switches of the overload reset and indicators block 495 or via a command from the electronic device 290.

The method 1300 includes starting, using the processor 240, a timer for a first time period corresponding to the first parameter threshold in response to determining that the measured quantity is equal to or exceeds the first parameter threshold (at block 1340). The processor 240 may determine that the first time period corresponds to the first period threshold based on the overload chart stored in the memory. The method 1200 further includes determining whether the first time period has elapsed (at block 1350).

The method 1300 further includes controlling, using the processor 240, the first switch (i.e., switch 410) to open in response to determining that the first time period has elapsed (at block 1360). When the switch 410 is opened, the power supply to the first output receptacle 510 is removed, thereby effectively removing the fault condition from the generator 100. The processor 240 may open the first switch (i.e., switch 410) while still keeping the other switches (i.e., switches 405 and 415-430) closed such that the other output receptacles 520, 530 still provide power to the devices connected to those receptacles 520, 530.

In some embodiments, the control module 400 and the control panel 500 may be implemented as part of a power adapter 1400. FIG. 14 illustrates an example embodiment of the control module 400 implemented in the power adapter 1400. The power adapter 1400 may include a power cord (not shown) that may be plugged into a wall outlet or a generator outlet. The power adapter 1400 receives input power from the power cord and provides output power through output receptacles 510-530. The methods 600, 700, 800, 900, and 1300 may be performed by the processor 240 of the power adapter 1400 similarly as described with the generator 100.

Although the invention has been described in detail with reference to certain preferred embodiments, variations and modifications exist within the scope and spirit of one or more independent aspects of the invention as described.

One or more independent features and/or independent advantages of the invention may be set forth in the claims.

What is claimed is:

1. A portable power generator comprising:
   an alternator powered by an engine and configured to generate an alternator output;
   a first output receptacle coupled to the alternator output through a first switch;
   a second output receptacle coupled to the alternator output through a second switch;
   a sensor unit configured to detect at least one output parameter of the first output receptacle; and
   an electronic processor coupled to the sensor unit and the first switch, the electronic processor configured to
      receive, from the sensor unit, first sensor signals indicating a measured quantity of the at least one output parameter of the first output receptacle,
      determine that the measured quantity exceeds a predetermined threshold, and
      control the first switch to open in response to determining that the measured quantity exceeds the predetermined threshold.

2. The portable power generator of claim 1, wherein the electronic processor is further configured to display, on a display unit of the portable power generator, the measured quantity of the at least one output parameter of the first output receptacle.

3. The portable power generator of claim 1, wherein the sensor unit detects at least one of an output current, an output voltage, an output frequency, and an output power of the first output receptacle.

4. The portable power generator of claim 1, wherein the electronic processor is further configured to provide, via a transceiver coupled to the electronic processor, data signals indicating a status of the first switch to an external electronic device, the status indicating whether the first switch is open or closed.

5. The portable power generator of claim 4, wherein the electronic processor is further configured to
   receive, via the transceiver, a control signal instructing the electronic processor to close the first switch from the external electronic device, the external electronic device sending the control signal in response to a user input, and
   control the first switch to close in response to receiving the control signal from the external electronic device.

6. The portable power generator of claim 4, wherein the electronic processor is further configured to provide, via a transceiver, second data signals indicating the measured quantity of the at least one output parameter of the first output receptacle to the external electronic device, and wherein the external electronic device displays the measured quantity on a display unit.

7. The portable power generator of claim 4, wherein the electronic processor is further configured to
   receive, via the transceiver, a control signal instructing the electronic processor to open the first switch from the external electronic device, the external electronic device sending the control signal in response to a user input, and
   control the first switch to open in response to receiving the control signal from the external electronic device.

8. The portable power generator of claim 1, wherein the electronic processor is coupled to the second switch and is further configured to keep the second switch closed when the first switch is opened.

9. The portable power generator of claim 8, further comprising a mode selector switch coupled to the electronic processor and adjustable between a first condition and a second condition, wherein the electronic processor is further configured to
   enable high-power output of the portable power generator and disable normal-power output of the portable power generator when the mode selector switch is in the first condition, and
   enable normal-power output of the portable power generator and disable high-power output of the portable power generator when the mode selector switch is in the second condition.

10. The portable power generator of claim 9, wherein the high-power output of the portable power generator corresponds to 240 volts (V) output at 30 Amps (A), and wherein the normal-power output of the portable power generator corresponds to 120V output at 20 A.

11. The portable power generator of claim 10, wherein the electronic processor enables the high-power output and disables the normal-power output by closing the first switch and opening the second switch, and wherein the electronic processor enables the normal-power output and disables the high-power output by opening the first switch and closing the second switch.

12. The portable power generator of claim 1, wherein the electronic processor is coupled to an engine ignition block and is further configured to control the engine ignition block to turn off the engine in response to determining that the measured quantity exceeds the predetermined threshold, and wherein the engine ignition block is controlled to turn off by closing an engine kill switch connected between the engine ignition block and ground.

13. A method of operating a portable power generator, the portable power generator including an alternator powered by an engine and configured to generate an alternator output, a first output receptacle coupled to the alternator output through a first switch, a second output receptacle coupled to the alternator output through a second switch, a sensor unit configured to detect and measure at least one output parameter of the first output receptacle, and an electronic processor coupled to the sensor unit and the first switch, the method comprising:
   receiving, from the sensor unit, first sensor signals indicating a measured quantity of the at least one output parameter of the first output receptacle;
   determining that the measured quantity exceeds a predetermined threshold; and
   controlling, using the electronic processor, the first switch to open in response to determining that the measured quantity exceeds the predetermined threshold.

14. The method of claim 13, further comprising displaying, on a display unit of the portable power generator, the measured quantity of the at least one output parameter of the first output receptacle.

15. The method of claim 13, further comprising providing, using the electronic processor via a transceiver, data signals indicating a status of the first switch to an external electronic device, the status indicating whether the first switch is open or closed.

16. The method of claim 15, further comprising:
receiving, via a transceiver, a control signal instructing the electronic processor to close the first switch from the external electronic device, the external electronic device sending the control signal in response to a user input; and
controlling, using the electronic processor, the first switch to close in response to receiving the control signal from the external electronic device.

17. The method of claim 15, further comprising providing, via a transceiver, second data signals indicating the measured quantity of the at least one output parameter of the first output receptacle to the external electronic device, wherein the external electronic device displays the measured quantity on a display unit.

18. The method of claim 15, further comprising:
receiving, via a transceiver, a control signal instructing the electronic processor to open the first switch from the external electronic device, the external electronic device sending the control signal in response to a user input; and
controlling, using the electronic processor, the first switch to open in response to receiving the control signal from the external electronic device.

19. The method of claim 13, wherein the second switch remains closed when the first switch is opened.

20. The method of claim 13, further comprising controlling, using the electronic processor, an engine ignition block to turn off the engine in response to determining that the measured quantity exceeds the predetermined threshold.

* * * * *